United States Patent [19]
Matsunaga et al.

[11] Patent Number: 5,510,918
[45] Date of Patent: Apr. 23, 1996

[54] LIQUID CRYSTAL DISPLAY DEVICE WITH A STRUCTURE OF IMPROVED TERMINAL CONTACT

[75] Inventors: Kuniyuki Matsunaga; Junichi Ohwada; Masahiko Suzuki, all of Mobara; Hideaki Yamamoto, Tokorozawa, all of Japan

[73] Assignee: Hitachi, Ltd., Tokyo, Japan

[21] Appl. No.: 250,439

[22] Filed: May 27, 1994

[30] Foreign Application Priority Data

Jun. 24, 1993 [JP] Japan ................................... 5-153292

[51] Int. Cl.$^6$ ............................................ G02F 1/13
[52] U.S. Cl. ................................... 359/88; 359/87
[58] Field of Search ......................... 359/88, 87, 74, 359/54

[56] References Cited

U.S. PATENT DOCUMENTS

| | | | |
|---|---|---|---|
| 4,826,297 | 5/1989 | Kubo et al. | 359/87 |
| 5,187,604 | 2/1993 | Taniguchi et al. | 359/87 |
| 5,270,848 | 12/1993 | Takabayashi et al. | 359/88 |
| 5,285,301 | 2/1994 | Shirahashi et al. | 359/87 |

FOREIGN PATENT DOCUMENTS

| | | |
|---|---|---|
| 61-167924 | 7/1986 | Japan . |
| 6018912 | 1/1994 | Japan . |

*Primary Examiner*—William L. Sikes
*Assistant Examiner*—Kenneth Parker
*Attorney, Agent, or Firm*—Antonelli, Terry, Stout & Kraus

[57] ABSTRACT

The gate terminal GTM is formed of the aluminum film g and the transparent conductive film dl, which is deposited on the aluminum film g. The gate terminal GTM is formed at its side with a connection portion where the transparent conductive film dl is not provided but where a connection film CNF made of second and third conductive films d2, d3 is provided to connect the aluminum film g and the transparent conductive film dl. At the side of the gate terminal GTM where the connection film CNF is provided, a terminal side portion protective film TSP1 at the same level as the passivation film PSV1 is formed. At the other side of the gate terminal GTM, a terminal side portion protective film TSP2 is provided, which consists of a film at the same level as the insulation film GI and a film at the same level as the passivation film PSV1.

4 Claims, 20 Drawing Sheets

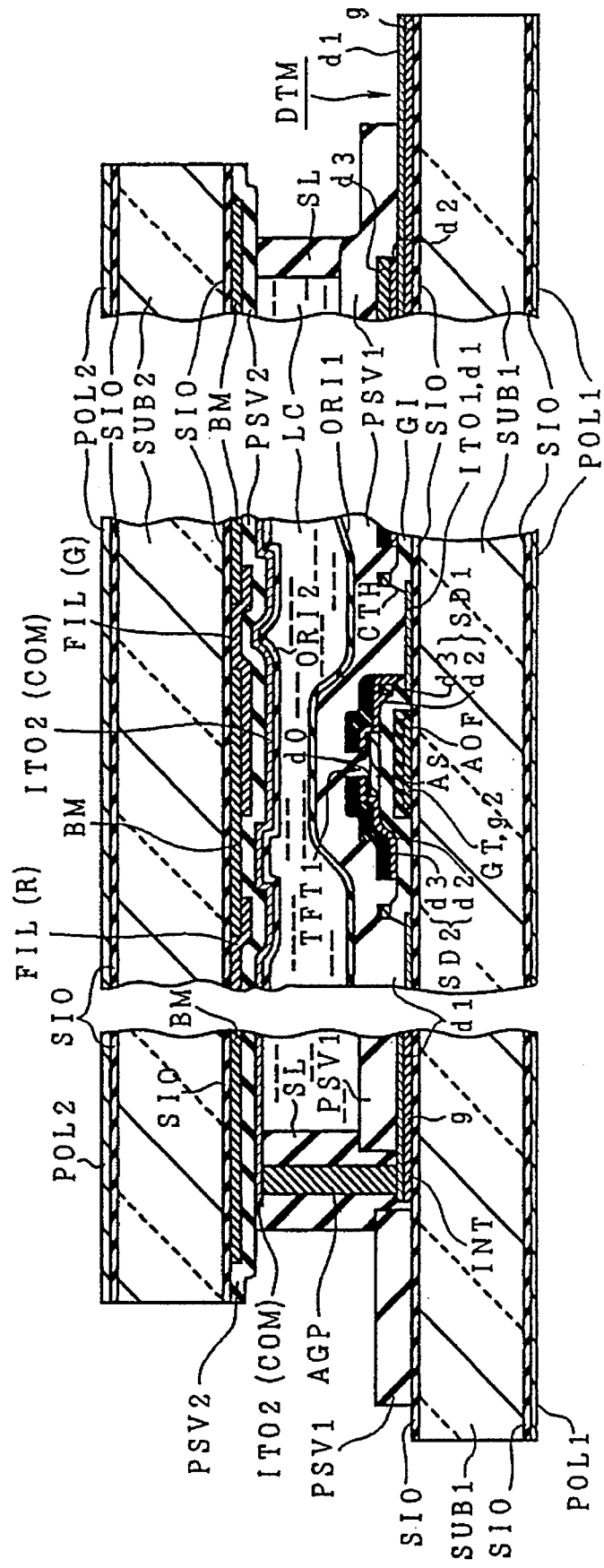

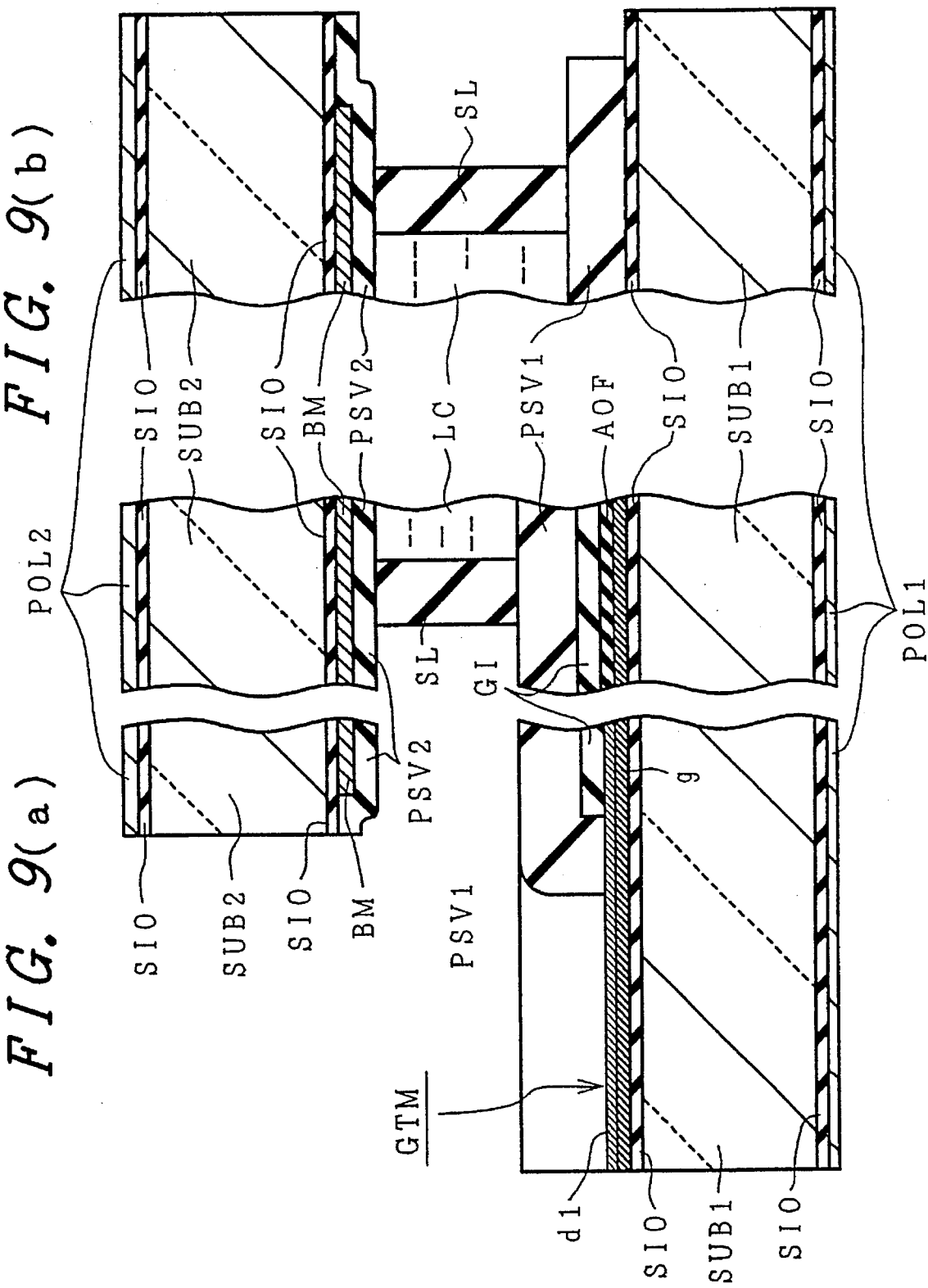

LIQUID CRYSTAL DISPLAY DEVICE WITH A STRUCTURE OF IMPROVED TERMINAL CONTACT

BACKGROUND OF THE INVENTION

The present invention relates to a liquid crystal display device and more particularly to a liquid crystal display device of active matrix type using thin film transistors (TFTs) or the like.

In a liquid crystal display device of the active matrix type, non-linear devices (e.g., switching devices) are disposed in a manner to correspond to a plurality of pixel electrodes arranged in a matrix array. The liquid crystal in each pixel is always in a driven state, in principle, (at a duty ratio of 1.0). In comparison with the so-called "simple matrix type" device, which employs a time division driving system, therefore, the active system has better contrast and, therefore, has become indispensable, particularly in a color liquid crystal display device. A typical example of the switching devices is a thin film transistor (TFT).

FIG. 21 is a cross section of a gate terminal portion of a conventional active matrix type liquid crystal display device. As shown in the figure, a transparent glass substrate SUB1 has silicon oxide films SIO deposited on the upper and lower surfaces thereof. On the upper silicon oxide film SIO a gate terminal GTM consisting of an aluminum film g and a transparent conductive film (Indium-Tin-Oxide (ITO): nesa film) dl is formed. On the lower silicon oxide film SIO a polarizing plate POL1 is formed.

A liquid crystal display device of the active matrix type using thin film transistors is described in Japanese Patent Laid-Open No. 309921/1988 or on pp. 193 to 210 of Nikkei Electronics is an article entitled "Active Matrix Type Color Liquid Crystal Display of 12.5 Type Adopting Redundant Construction" published on Dec. 15, 1986 by NIKKEI McGRAW-HILL, for example.

SUMMARY OF THE INVENTION

In a typical liquid crystal display device, because the boundary reaction between Al and ITO forms an $Al_2O_3$ film, which is an insulating film, between the aluminum film q and the transparent conductive film dl, the resistance between the aluminum film g and the transparent conductive film dl increases. That is, the resistance of the gate terminal GTM also increases.

The aluminum film g may be dissolved by a cleaning liquid or by galvanic corrosion. In such a case the resistance of the gate terminal GTM increases.

The present invention is directed to solve the above-mentioned problems and its objective is to provide a liquid crystal display device that keeps the terminal resistance from increasing.

To achieve this objective, the terminal of the display device, in accordance with this invention, is formed of a first metal film and a transparent conductive film deposited on the first metal film and is also formed at its side with a connection portion where the transparent conductive film is not deposited and on which a connection film is formed to connect the first metal film and the transparent conductive film.

In this case, the first metal film is formed as an aluminum film.

Alternatively, the first metal film is formed as a tantalum film.

Further, the terminal is formed of the first metal film and the transparent conductive film deposited on the first metal film, and has its side portion provided with a terminal side portion protective film.

In this liquid crystal display device, even if an insulation film forms between the first metal film and the transparent conductive film, the connection film that connects the first metal film and the transparent conductive film keeps the resistance between these two films from increasing.

Further, the terminal side portion protective film can prevent the side portion of the first metal film from being dissolved by a cleaning liquid or galvanic corrosion.

BRIEF DESCRIPTION OF THE DRAWINGS

FIG. 8 includes portions A, B and C of a section showing the pixel portion of a matrix at the center and the vicinity of a panel corner and the vicinity of a video signal terminal portion at the two sides;

FIG. 9 includes portions A and B are a cross section showing, on the left side, a panel edge portion with a gate terminal and, on the right side, a panel edge portion without an external connection terminal.

DESCRIPTION OF THE PREFERRED EMBODIMENTS

Figure 1:
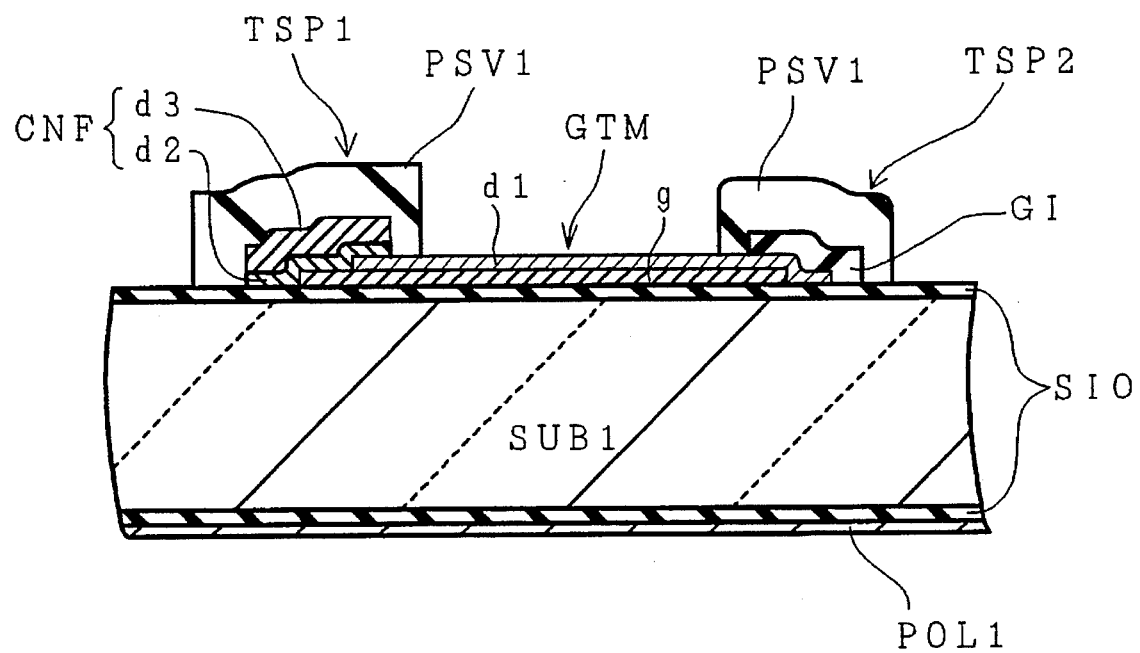
FIG. 1 is an enlarged cross section taken along the line 1—1 of FIG. 10(A)

The present invention, other objects of the present invention, and other features of the present invention will become apparent from the following description to be made with reference to the accompanying drawings.

<<Active Matrix Liquid Crystal Display Device>>

There will be described in the following the construction of various embodiments of a color liquid crystal display device of the active matrix type, to which is applied the present invention. Incidentally, parts having identical functions are designated by identical reference characters throughout all the Figures for describing the embodiments, and their repeated descriptions will be omitted.

<<Summary of Matrix Portion>>

Figure 2:
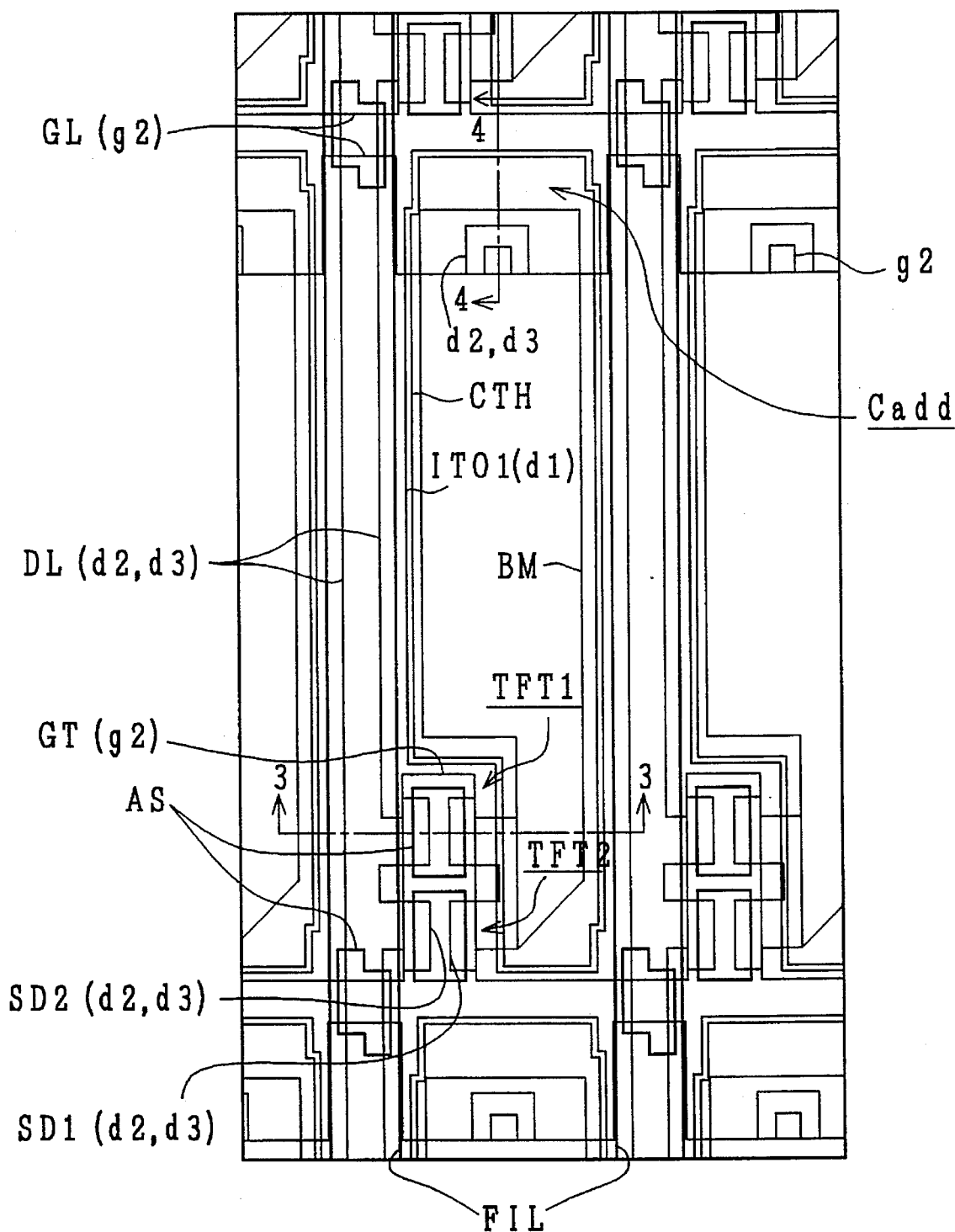
FIG. 2 is a plan view showing one pixel of the liquid crystal display section of the active matrix type color liquid crystal display device according to this invention and also the peripheral circuits of the pixel.
Figure 3:
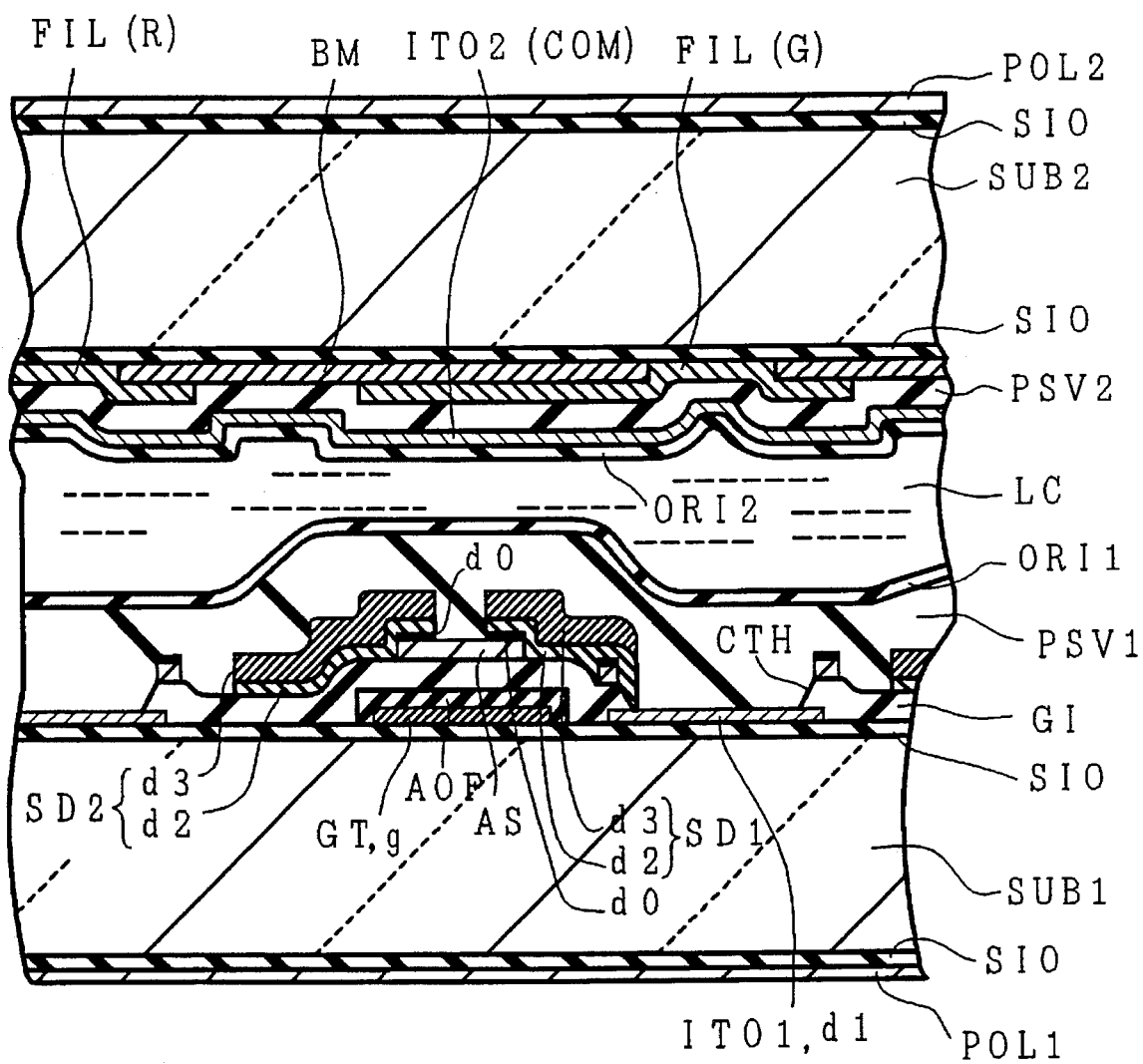
FIG. 3 is a section taken along line 3—3 of FIG. 2 and shows one pixel and its peripheral portion.
Figure 4:
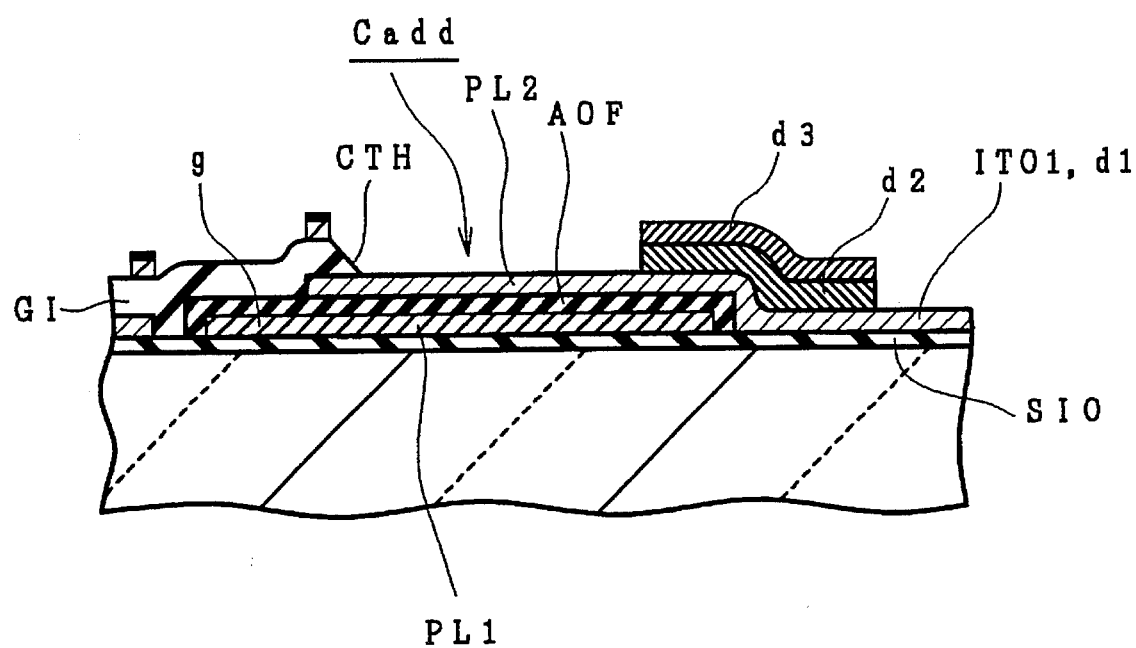
FIG. 4 is a section taken along line 4—4 of FIG. 2 and shows a latching capacitor Cadd.

FIG. 2 is a top plan view showing one embodiment of one pixel and its peripheral portion of the active matrix type color liquid crystal display device to which is applied the present invention. FIG. 3 is a section taken along line 3—3 of FIG. 2. FIG. 4 is a section taken along line 4—4 of FIG. 2.

As shown in FIG. 2, each pixel is arranged in a cross region (defined by four signal lines) between two adjacent scanning signal lines (gate signal lines or horizontal signal lines) GL and two adjacent video signal lines (drain signal lines and vertical signal lines) DL. Each pixel includes a thin film transistor TFT, a transparent pixel electrode ITO1, and a latching capacitor Cadd. The scanning signal lines GL extend in the lateral direction and are parallelly arranged in the vertical direction. The video signal lines DL extend in the vertical direction and are parallelly arranged in the lateral direction.

As shown in FIG. 3, the thin film transistor TFT and the transparent pixel electrode ITO1 are formed at the side of a lower transparent glass substrate SUB1 across a liquid crystal layer LC, and a color film FIL and a back matrix pattern BM for light shielding are formed at the side of an upper transparent glass substrate SUB2. The side of the lower transparent glass substrate SUB1 is made to have a thickness of about 1.1 mm, for example. On both surfaces of the transparent glass substrates SUB1 and SUB2, there are formed silicon oxide layers SIO which are deposited by dip treatment.

On the surface of the upper transparent glass substrate SUB2 at the inner side (or the side of the liquid crystal LC), there are sequentially laminated the light-shielding film BM, the color filter FIL, a passivation film PSV2, a common transparent pixel electrode ITO2 (or COM) and an upper orientation film ORI2.

<<Summary of Matrix Periphery>>

Figure 5:
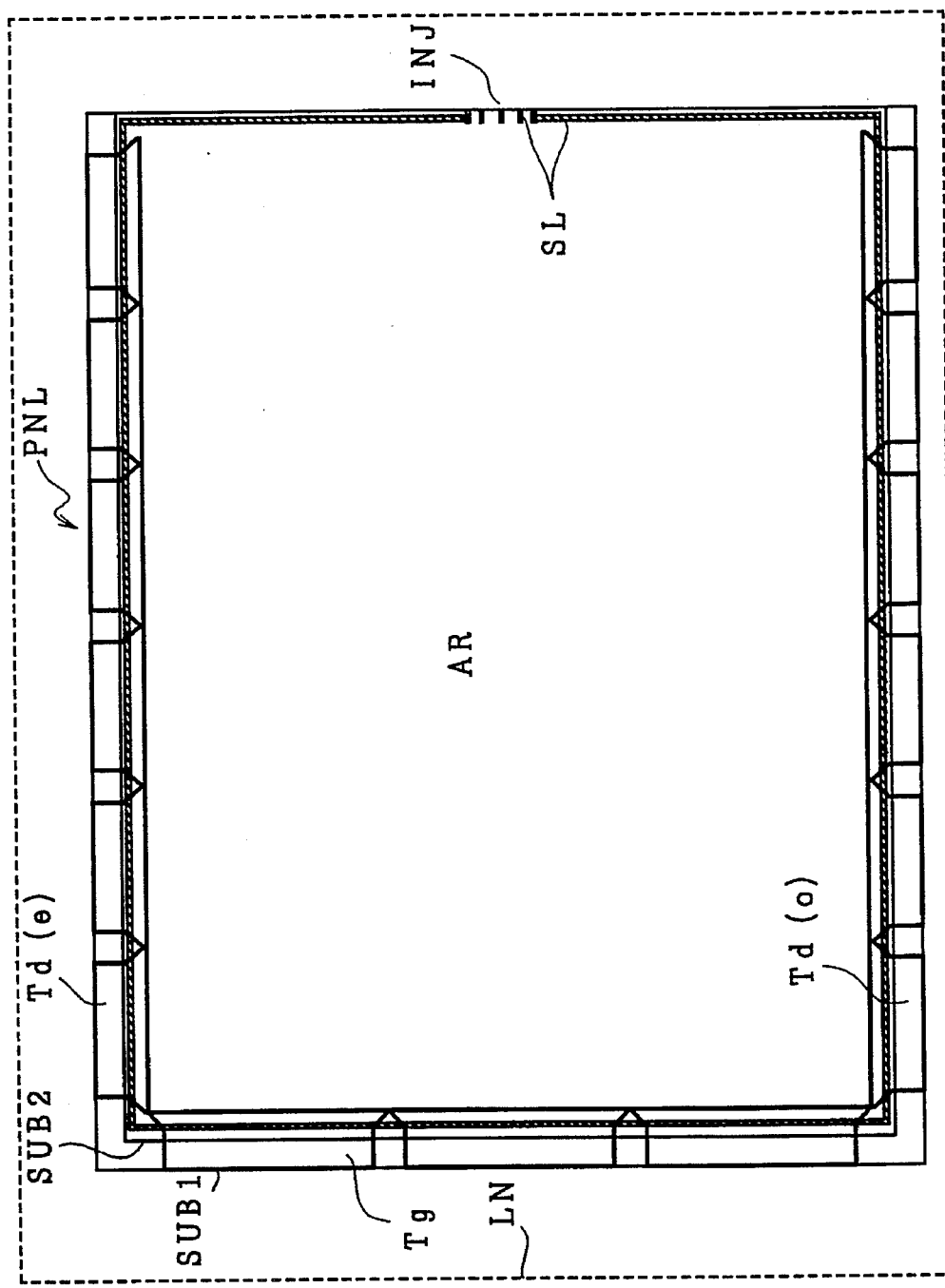
FIG. 5 is a top plan view of a matrix peripheral portion of a display panel.
Figure 6:
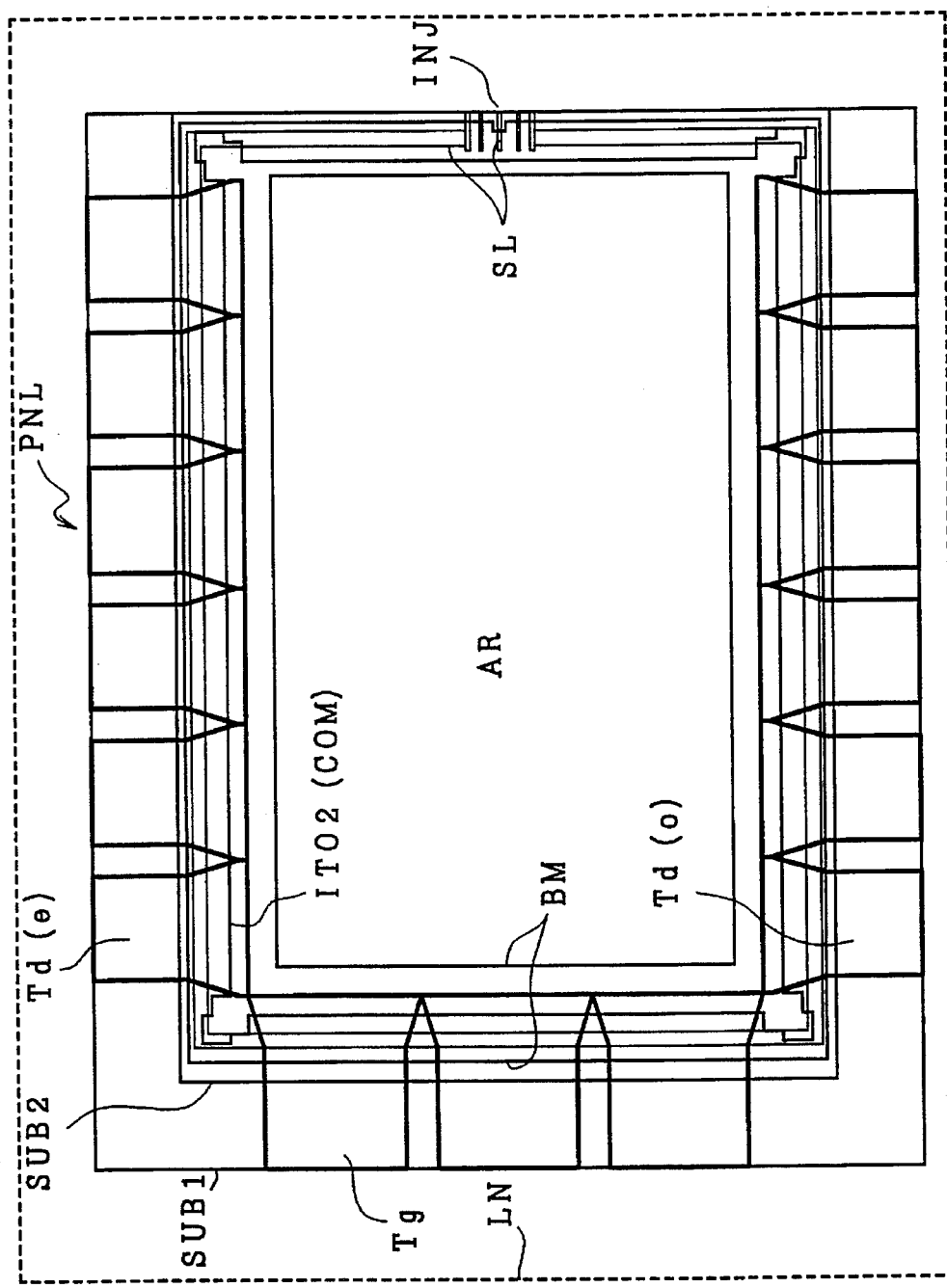
FIG. 6 is a top plan view which exaggerates the peripheral portion of FIG. 5 to illustrated the details thereof more specifically.
Figure 7:
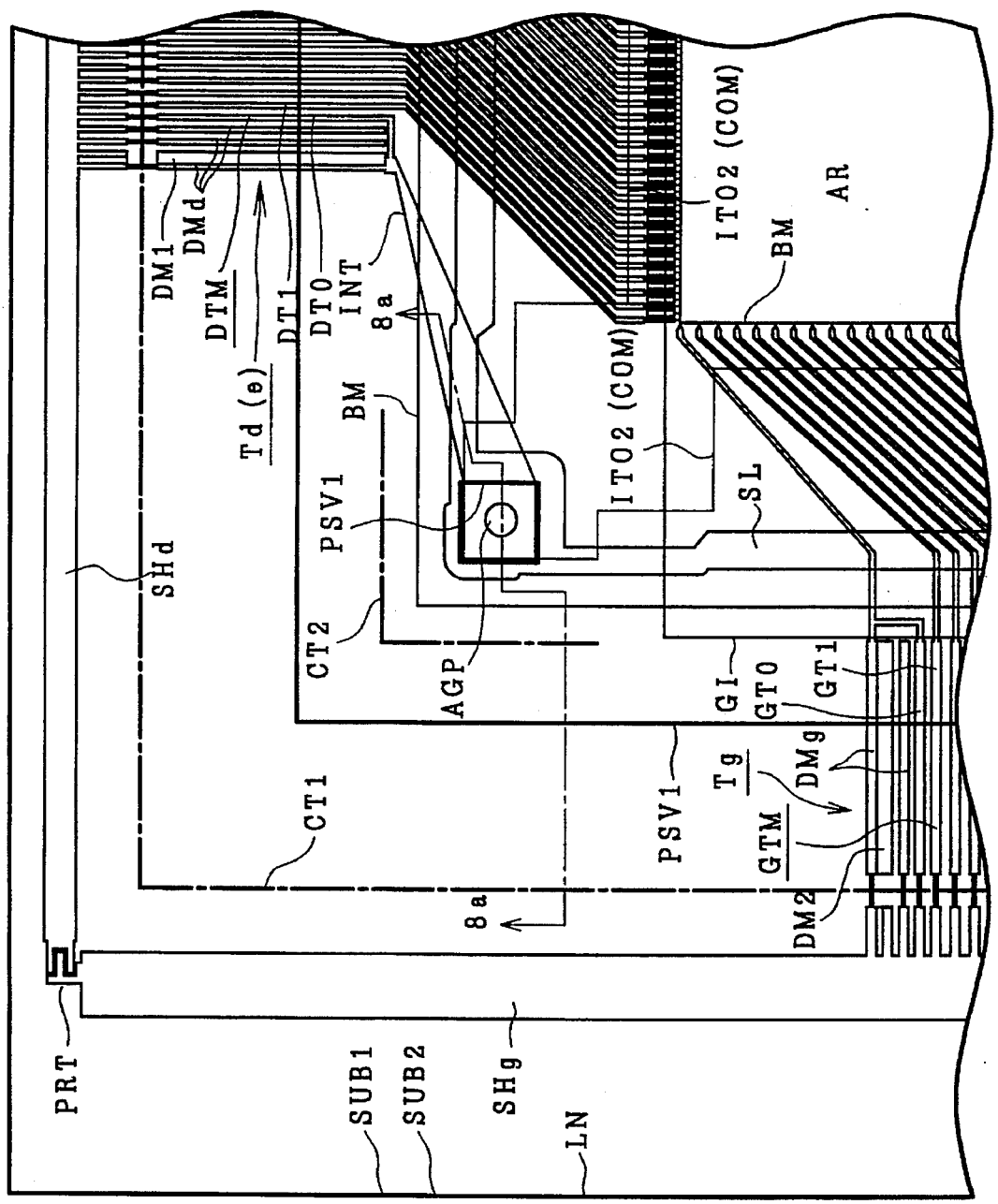
FIG. 7 is an enlarged top plan view showing a corner of a display panel including an electric connection portion of the upper and lower substrates.

FIG. 5 is a top plan view showing an essential portion of the periphery of a matrix (AR) of a display panel PNL including the upper and lower glass substrates SUB1 and SUB2. FIG. 6 is a top plan view further exaggerating the peripheral portion. FIG. 7 is an enlarged top plan view showing the vicinity of a seal portion SL corresponding to the lefthand upper corner of the panel of FIGS. 5 and 6.

FIG. 8(b) shows, at the center, the cross section of FIG. 3; FIG. 8(a) shows, on the left, the cross section taken along the line 8a—8a of FIG. 7; and, FIG. 8(c) shows, on the right, the cross section of the drain terminal DTM-an external connection terminal to which a video signal drive circuit is to be connected—and its surrounding portion. Similarly FIG. 9(a) shows, on the left, the gate terminal GTM-an external connection terminal to which the vertical scan circuit is to be connected—and FIG. 9(b) shows, at the right, a seal portion with no external connection terminal and its surrounding portion.

In a fabrication of this panel, if the panel is small, a plurality of devices are simultaneously formed on a single glass substrate, which is then divided in order to improve the throughput. If the panel is large, a glass substrate of standard size is used for any kind of panel and is worked and reduced to sizes matching individual kinds so as to share the fabrication facilities. In either case, the glass substrate is cut after a series of processes has been performed. FIGS. 5 to 7 represent the latter case, FIGS. 5 and 6 both showing the transparent glass substrates SUB1, SUB2 after having been cut, FIG. 7 showing these glass substrates before being cut. Symbol LN represents the edge of the transparent glass substrates SUB1, SUB2 before being cut, and CT1 and CT2 represent the cutting line along which the transparent glass substrates SUB1, SUB2 are to be cut. In either case, in portions (in the figure, the upper and lower sides and the left side) where the external connection terminals Tg, Td (suffix omitted) exist, the upper transparent glass substrate SUB2 is limited in size so that it is inside of the lower transparent glass substrate SUB1 in a finished state. The terminals Tg, Td are so designated to include gate terminals GTM for connection with the vertical scan circuit described later, drain terminals DTM for connection with the video signal drive circuit and their leadout interconnects, all these being grouped together for each tape carrier package TCP (FIGS. 18, 19) that mounts an integrated circuit chip. The leadout lines from the matrix portion AR of each group to the external connection terminals are inclined as they come close to the ends. This is to make the terminals DTM, GTM of the display panel PNL match the arrangement pitch of the tape carrier package TCP and the connection terminal pitch in each tape carrier package TCP.

Between and along the edges of the transparent glass plates SUB1 and SUB2, there is formed the seal pattern SL for sealing the liquid crystal LC, except for a liquid crystal entrance INJ. The seal pattern is made of an epoxy resin, for example. The common transparent pixel electrode ITO2 at the side of the upper transparent glass substrate SUB2 is connected at the four corners of a display panel PNL in this display device with a leading line INT, which is formed at the side of the lower transparent glass substrate SUB1, in at least one portion by a silver paste material AGP. The leading line INT is formed at the same fabrication step as that of the later-described gate terminal GTM and drain terminal DTM.

The orientation film ORI1 and ORI2, the transparent pixel electrode ITO1, the common transparent pixel electrode ITO2, and the individual layers are formed in the seal pattern SL. Polarization plates POL1 and POL2 are individually formed on the outer surfaces of the lower transparent glass substrate SUB1 and the upper transparent glass substrate SUB2. The liquid crystal LC is filled in the region which is defined by the seal pattern SL between the lower orientation film ORI1 and the upper orientation film ORI2 for setting the orientations of the liquid crystal molecules. The lower orientation film ORI1 is formed over a passivation film PSV1 at the side of the lower transparent glass substrate SUB1.

This liquid crystal display device is assembled by superposing the individual layers at the sides of the lower transparent glass substrate SUB1 and the upper transparent glass substrate SUB2; by forming the seal pattern SL at the side of the upper transparent glass substrate SUB2; by superposing the upper transparent glass substrate SUB1 and the lower transparent glass substrate SUB2; by injecting the liquid crystal LC from the liquid crystal entrance INJ of the seal pattern SL to seal the entrance INJ with the epoxy resin or the like; and by cutting the transparent glass substrates SUB1, SUB2.

<<Thin-Film Transistor TFT>>

Next, let us return to FIG. 2 and FIG. 3 to describe the detailed configuration of the lower transparent glass substrate SUB1 formed with the thin-film transistor TFT.

If a positive bias is applied to the gate electrode GT, the thin film transistor TFT has the channel resistance reduced between its source and drain. If the bias is reduced to zero, the thin film transistor TFT operates to have its channel resistance increased.

Each pixel is provided with a redundant number (two) of thin-film transistors TFT1, TFT2. These two thin-film transistors TFT1, TFT2 are formed to have substantially the same sizes (in channel length and width) and are each composed of a gate electrode GT, a gate insulating film GI, an i-type (i.e., intrinsic type not doped with a conductivity type determining impurity) amorphous Si semiconductor layer AS, and a pair of electrodes including a source electrode SD1 and a drain electrode SD2. The source and drain are intrinsically determined by the bias polarity between them, and this polarity is inverted during the operation in the circuit of the present display device. Thus, it should be understood that the source and drain are interchanged during the operation. In the following description, however, one is fixed as the source, whereas the other is fixed as the drain, for convenience sake.

<<Gate Electrode GT>>

The gate electrode GT is formed to project perpendicularly from the scanning signal lines GL (or branched in the "T-shape"). The gate electrode GT is extended to the regions to be individually formed with the thin film transistors TFT1 and TFT2. These thin film transistors TFT1 and TFT2 have their individual gate electrodes GT integrated (as their common gate electrode) to merge into the scanning signal line GL. The gate electrode GT is constituted by the signal level aluminum layer g.

Aluminum film g may use an Al-Ta film, Al-Ti film, Al-Ta-Ti film (added amount of Ta and Ti to these films: 0.5—2.5 atomic percent) or pure Al film, formed by sputtering to a thickness of about 1000–5500 Å. An anodic oxide film AOF is deposited on the gate electrode GT.

This gate electrode GT is formed to be slightly larger than the i-type semiconductor layer AS so that it can cover it completely (when viewed from below). This prevents the i-type semiconductor layer AS from being exposed to external light or backlight.

<<Scanning Signal Line GL>>

The scanning signal line GL is constituted by the aluminum film g. The aluminum film g of the scanning signal line GL is formed at the same step as, and integrally with, the aluminum film g of the gate electrode GT. Moreover, the scanning signal line GL is also formed thereon with the anodized oxide film AOF of Al.

<<Insulating Film GI>>

The insulating film GI is used as a gate insulating film to apply an electric field to the i-type semiconductor layer AS as well as the gate electrode in the thin-film transistors TFT1, TFT2.

The insulation film GI is formed over the gate electrode GT and the scan signal line GL. The insulation film GI on the transparent pixel electrode ITO1 is formed with a connection hole CTH.

The insulating film GI may be formed of a Si nitride film, prepared by plasma CVD and having a thickness from 200 Å to 2700 Å (in this display device approximately 2000 Å). The gate insulating film GI, as shown in FIG. 7, is formed to cover the entire matrix section AR and is removed at its periphery to expose the external connection terminals DTM and GTM. The insulating film GI also contributes to electrical insulation of the scanning signal line GL and video signal line DL.

<<i-Type Semiconductor Layer AS>>

The i-type semiconductor layer AS in this example is formed of amorphous silicon as isolated islands in each of the thin-film transistor TFT1, TFT2 to a thickness of 200–2200 Å (in this display device, about 2000 Å). Denoted as d0 is an N(+) type semiconductor layer formed of N(+) type amorphous silicon doped with phosphorus for ohmic contact and is left where there is an underlying i-type semiconductor layer AS and an overlying conductive film d2 (d3).

The i-type semiconductor layer AS is also formed between the intersecting portions (or crossover portions) of the scanning signal line GL and the video signal line DL. This crossover i-type semiconductor layer AS is formed to reduce the short-circuiting between the scanning signal line GL and the video signal line DL at the intersecting portion.

<<Transparent Pixel Electrode ITO1>>

The transparent pixel electrode ITO1 constitutes one of the parts of a pixel electrode of a liquid crystal display.

The transparent pixel electrode ITO1 is connected with both the source electrode SD1 of the thin film transistor TFT1 and the source electrode SD1 of the thin film transistor TFT2. Even if, therefore, one of the thin film transistors TFT1 and TFT2 become defective, a suitable portion may be cut by a laser beam in case the defect invites an adverse action. Otherwise, the situation may be left as it is because the other thin film transistor is normally operating.

The transparent pixel electrode ITO1 is formed of a transparent conductive film (first conductive film) d1 to a thickness of 1000–2000 Å (in this display device, about 1400 Å).

<<Source Electrode SD1, Drain Electrode SD2>>

The source electrode SD1 and the drain electrode SD2 are each formed of a second conductive film d2 in contact with the N(+) type semiconductor layer d0 and a third conductive film d3 formed over the second conductive film d2.

The second conductive film d2 is a sputtered Cr film with a thickness of 500 to 1000 Å (in this display device about 600 Å). The Cr film is formed in the thickness range not exceeding approximately 2000 Å because too thick a film will increase stresses. The Cr film is used as a barrier layer to improve the adhesion of the third conductive film d3 to the N(+) type semiconductor layer d0 and prevent the aluminum of the third conductive film d3 from diffusing into the N(+) type semiconductor layer d0. As the second conductive film d2, it is possible to use high melting point metal (Mo, Ti, Ta, W) films and their silicide ($MoSi_2$, $TiSi_2$, $TaSi_2$, $WSi_2$) films, in addition to the Cr film.

The third conductive film d3 is formed by aluminum sputtering to a thickness of 3000 Å to 5000 Å (in this display device 4000 Å). The aluminum (Al) film has smaller stresses than the Cr film and thus can be formed to a greater thickness, reducing resistance of the source electrode SD1, drain electrode SD2 and video signal line DL, and ensuring a reliable pass over stepped geometry produced by gate electrode GT and i-type semiconductor layer AS. (In other words, it improves step coverage).

After the second conductive film d2 and the third conductive film d3 are patterned using one and the same mask pattern, the N(+) type semiconductor layer d0 is removed by using the same mask or by using the second conductive film d2 and third conductive film d3 as a mask. That is, the N(+) type semiconductor layer d0 remaining on the i-type semiconductor layer AS is removed self-aligningly from other than the second conductive film d2 and third conductive film d3. At this time, because the N(+) type semiconductor layer d0 is etched away completely to its full thickness, the i-type semiconductor layer AS is slightly etched at its surface. The degree of this etching can be controlled by the etching time.

<<Video Signal Line DL>>

The video signal line DL is formed of the second conductive film d2 and third conductive film d3, the same layers as the source electrode SD1 and drain electrode SD2.

<<Passivation Film PSV1>>

Over the thin film transistor TFT and the transparent pixel electrode ITO1, there is formed the passivation film PSV1, which is provided mainly for protecting the thin film transistor TFT against humidity or the like. Thus, the passivation film PSV1 to be used is highly transparent and humidity resistant.

The passivation film PSV1 may be made from a silicon oxide film or silicon nitride film, deposited by plasma CVD equipment to a thickness of about 1 μm.

The passivation film PSV1 is formed, as shown in FIG. 7, to enclose the entirety of the matrix portion AR and is removed at its peripheral portion to expose the external connection terminals DTM and GTM to the outside and at the portion in which the common electrode (COM) at the side of the upper transparent glass substrate SUB2 is connected with the external connection terminal connecting leading line INT of the lower transparent glass substrate SUB1 by means of the silver paste AGP. In connection with the thickness connection between the passivation film PSV1 and the gate insulating film GI, the former is made thick in consideration of the passivation effect, whereas the latter is made thin in consideration of the mutual conductance gm of the transistor. As a result, as shown in FIG. 7, the passivation film PSV1 having a high passivation effect is made sufficiently larger than the insulating film GI as to have its peripheral portion passivated as wide as possible.

<<Shielding Film BM>>

On the upper transparent glass substrate SUB2 side, a shielding film BM is provided that prevents external light or backlight from entering the i-type semiconductor layer AS. A closed polygonal outline of the shielding film BM shown in FIG. 2 represents an opening inside of which no shielding film BM will be formed. The shielding film is formed of Al or Cr, which have a good light shielding characteristic. In this display device, there is used a Cr film formed by sputtering to a thickness of about 1300 Å.

Therefore, the i-type semiconductor layer AS of thin-film transistors TFT1, TFT2 is sandwiched with the overlying shielding film BM and the underlying, slightly larger, gate electrode GT, and is shielded against external natural light and backlight. The shielding film BM is formed around each pixel in a lattice shape (so-called black matrix). This lattice defines the effective display region for each pixel. Because the contour of each pixel is clearly defined by the shielding film BM, the contrast improves. In other words, the shielding film BM has the two functions of blocking light from entering the i-type semiconductor layer AS and serving as a back matrix.

Since the edge portion of the transparent pixel electrode ITO1 on the foot side of the rubbing direction (lower right portion in FIG. 2) is also shielded by the shielding film BM, even if a domain is induced at the above portion, the display characteristic will not deteriorate because the domain is not seen.

The shielding film BM is additionally formed at its peripheral portion with a framed pattern, as shown in FIG. 6, which is formed to merge into the pattern of the matrix portion having a plurality of dot-shaped openings, as shown in FIG. 2. The shielding film BM at the peripheral portion is extended to the outside of the seal pattern SL, as shown in FIGS. 6 to 9(b), thereby to prevent leakage light, such as the light reflected from an implemented machine, such as a personal computer, from entering the matrix portion. On the other hand, the shielding film BM is limited to the inside of the edge of the transparent glass substrate SUB2 within about 0.3 to 1.0 mm and is formed to avoid the cut region of the transparent glass substrate SUB2.

<<Color Filter FIL>>

The color filters FIL are formed in stripes of repeating colors-red, green and blue-at positions facing each pixel.

The color filter FIL is formed to be large enough to cover the entire transparent pixel electrode ITO1, and the shielding film BM is formed inside the periphery of the transparent pixel electrode ITO1 so that it overlaps the edge portions of the color filter FIL and the transparent pixel electrode ITO1.

The color filter FIL may be formed as follows.

First, a dyeing base, such as acrylic resin, is formed over the surface of the upper transparent glass substrate SUB2. The dyeing base in areas other than those where a red filter will be formed is removed by photolithography. Then, the remaining dyeing base is dyed with red dye and fixed to form a red filter R. Similar steps are followed to subsequently produce a green filter G and a blue filter B.

<<Passivation film PSV2>>

The passivation film PSV2 is provided for preventing dyes of color filters FIL from leaking into the liquid crystal LC. The passivation film PSV2 may use such transparent resin materials as acrylic resin and epoxy resin.

<<Common Transparent Pixel Electrode ITO2>>

The common transparent pixel electrode ITO2 is opposed to the transparent pixel electrode ITO1, which is provided for each pixel at the side of the lower transparent glass substrate SUB1, so that the liquid crystal LC has its optical state varied in response to the potential difference (or electric field) between each pixel electrode ITO1 and the common pixel electrode ITO2. This common transparent pixel electrode ITO2 is supplied with the common voltage Vcom. In this display device, this common voltage Vcom is set at an intermediate potential between a driving voltage Vdmin at the low level and a driving voltage Vdmax at the high level, both of which are applied to the video signal line DL. An AC voltage may be applied in case the supply voltage of the integrated circuit to be used in the video signal drive circuit is to be reduced to one half. Incidentally, the top plan shape of the common transparent pixel electrode ITO2 should be referred to FIGS. 6 and 7.

<<Structure of Latching Capacitor Cadd>>

The transparent pixel electrode ITO1 is formed to overlap the adjoining scanning signal line GL at the portion opposed to the end to be connected with the thin film transistor TFT. This superposition constitutes a latching capacity element (or an electrostatic capacity element) Cadd which uses the transparent pixel electrode ITO as its one electrode PL2 and the adjoining scanning signal line GL as its other electrode PL1, as is apparent from FIGS. 4. This latching capacity element Cadd has its dielectric films formed of the insulating film GI, used as the gate insulating film of the thin film transistor TFT, and the anodized film AOF.

The dielectric film of the latching capacitor Cadd is formed of an anodic oxide film AOF.

The latching capacitor Cadd is formed in the widened portion of the aluminum layer g of the scanning gate line GL. Here, the aluminum film g at the portion intersecting the video signal line DL is thinned to reduce the probability of short-circuiting with the video signal line DL.

Even if the transparent pixel electrode ITO1 is broken at the stepped portion of the electrode PL1 of the latching capacitor Cadd, this defect is compensated by the island region which is constructed of the second conductive film d2 and the third conductive film d3 formed cross that step.

<<Gate Terminal GTM>>

Figures 10A, 10B:
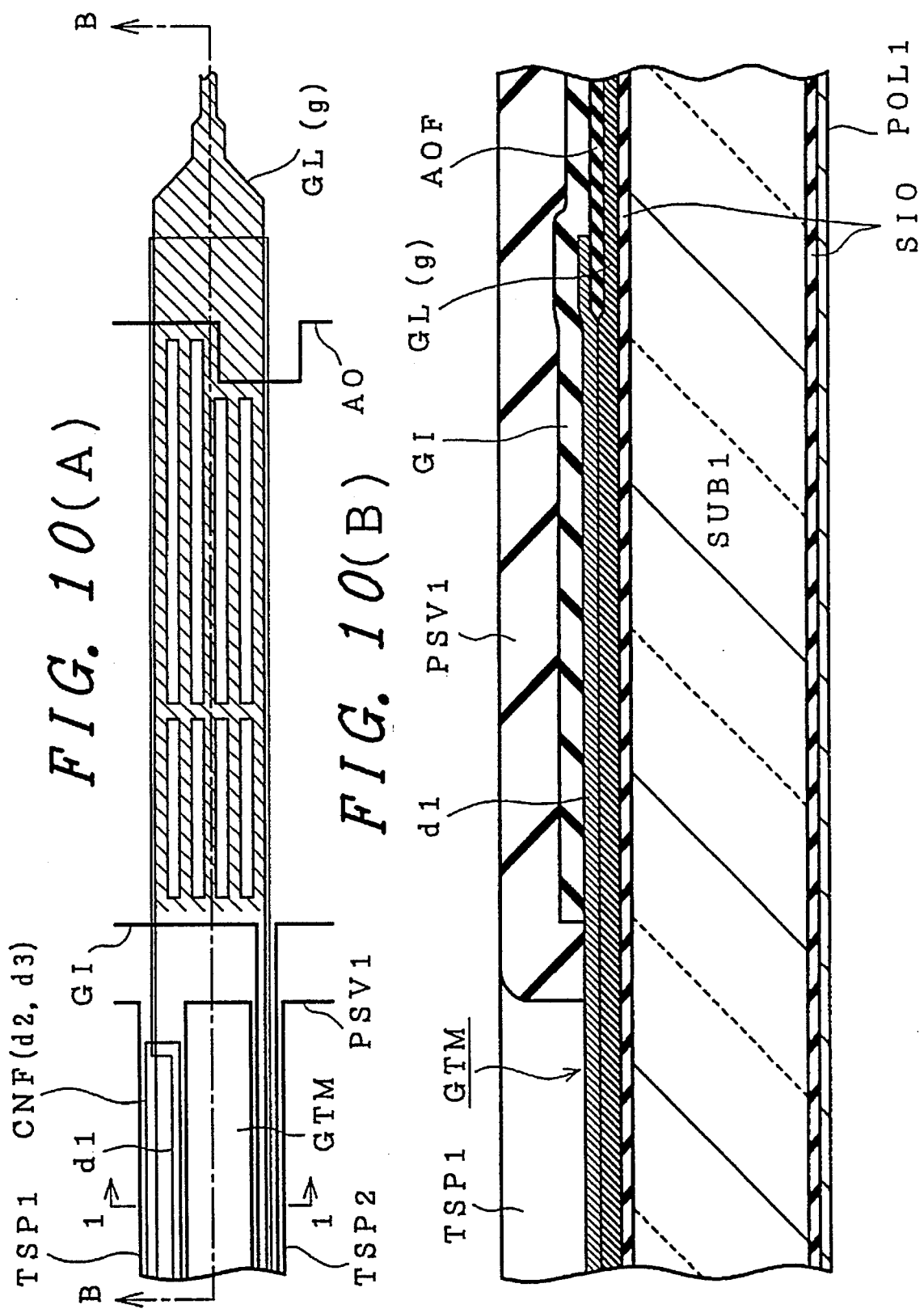
FIG. 10(A) presents a top plan view and FIG. 10(B) presents a section showing the vicinity of a connecting portion between a gate terminal GTM and a scanning signal line GL.

FIGS. 10(A) and 10(B) show the connection structure from the scan signal line GL of the display matrix to its external connection terminal, the gate terminal. FIG. 10(A) represents a plan view and FIG. 10(B) a cross-section taken along the line B—B of FIG. 10(A). The figures cover an area at the lower part of FIG. 7 and the inclined interconnects are shown by straight lines for simplicity.

AO is a mask pattern for photo processing, a photoresist pattern for selective anodic oxidation. Thus, this photoresist is removed after anodic oxidation and the pattern AO will not remain on a finished product, but its locus will remain on the scan signal line GL because the oxide film AOF is selectively formed on the scan signal line GL, as shown in the cross section. In the plan view, on the left side of the photoresist boundary line AO, is an area which is covered with the resist for protection against the anodic oxidation; on the right side is an area that is exposed from the resist for anodic oxidation. The aluminum film g, which is anodic-oxidized, is formed on its surface with an anodic-oxidized film (aluminum oxide film $Al_2O_3$) AOF reducing the volume of the underlying conductive portion. The anodic oxidation is, of course, performed by setting a proper time and voltage to leave the conductive portion. The mask pattern AO crosses the scan signal line GL not in a straight line, but in a cranked line.

The aluminum layer g, as shown, is hatched for easy understanding, but the region which is left non-anodized is patterned in a comb shape. This is intended to suppress the probability of line breakage and the sacrifice of conductivity to a minimum, while preventing any formation of whiskers by narrowing the width of each aluminum layer g and bundling a plurality of them in parallel, because the whisker will occur in the surface for the wide aluminum layer g. In the present embodiment, therefore, the portion corresponding to the root of the comb is displaced along the mask AO.

As shown in FIG. 1, the gate terminal GTM is formed of the aluminum film g and the transparent (first) conductive film dl, which is deposited on the aluminum film g to protect its surface. The transparent conductive film dl is on the same level as the transparent pixel electrode ITO1 (i.e. formed on the same layer and at the same time as the electrode ITO1).

The gate terminal GTM is formed at its side with the connection portion where the transparent conductive film is not provided, but where a connection film CNF made of the second and third conductive films d2, d3 is provided. Because the connection film CNF connects the aluminum film g and the transparent conductive film dl, the resistance between the aluminum film g and the transparent conductive film dl is prevented from increasing even when an insulating film ($Al_2O_3$) is formed between the aluminum film g and the transparent conductive film dl. In other words the resistance of the gate terminal GTM will not increase.

At the side of the gate terminal GTM where the connection film CNF is provided, a terminal side portion protective film TSP1 is formed at the same level as the passivation film PSV1. At the other side of the gate terminal GTM, a terminal side portion protective film TSP2 is provided, which consists of a film formed at the same level as the insulation film GI and a film formed at the same level as the passivation film PSV1. The terminal side portion protective films TSP1, TSP2 prevent the side portion of the aluminum film g from being dissolved by a cleaning liquid or by galvanic corrosion, thereby keeping the resistance of the gate terminal GTM from increasing. Because a film at the same level as the insulating film GI—the first layer of the terminal side portion protective film TSP2—is provided, if there are pin holes in the transparent conductive film dl and second conductive film d2 on the side of the gate terminal GTM where the terminal side portion protective film TSP2 is provided, the aluminum film g can be protected against damage during the etching of the third conductive film d3. This is turn prevents the resistance of the gate terminal GTM from increasing.

In the plan view, the insulating film GI is formed on the right side of its boundary line and the passivation film PSV1 is also formed on the right side of its boundary line. The gate terminal GTM situated at the left end is exposed from these films for electric contact with external circuits. Although in the figure only one pair of the scan signal line GL and the gate terminal GTM is shown, the actual device has a plurality of such pairs arranged vertically to form a group of terminals Tg (FIG. 6 and 7) as shown in FIG. 7. During the manufacturing process, the left end of the gate terminal GTM is extended beyond the cutting line CT1 of the lower transparent glass substrate SUB1 and is shorted by the conductor SHg. Such a short-circuit conductor SHg is, in the manufacturing process, advantageous for power feeding during the anodic oxidation and for prevention of electrostatic breakdown during rubbing of the orientation film ORI1.

<<Drain Terminal DTM>>

Figure 11A:
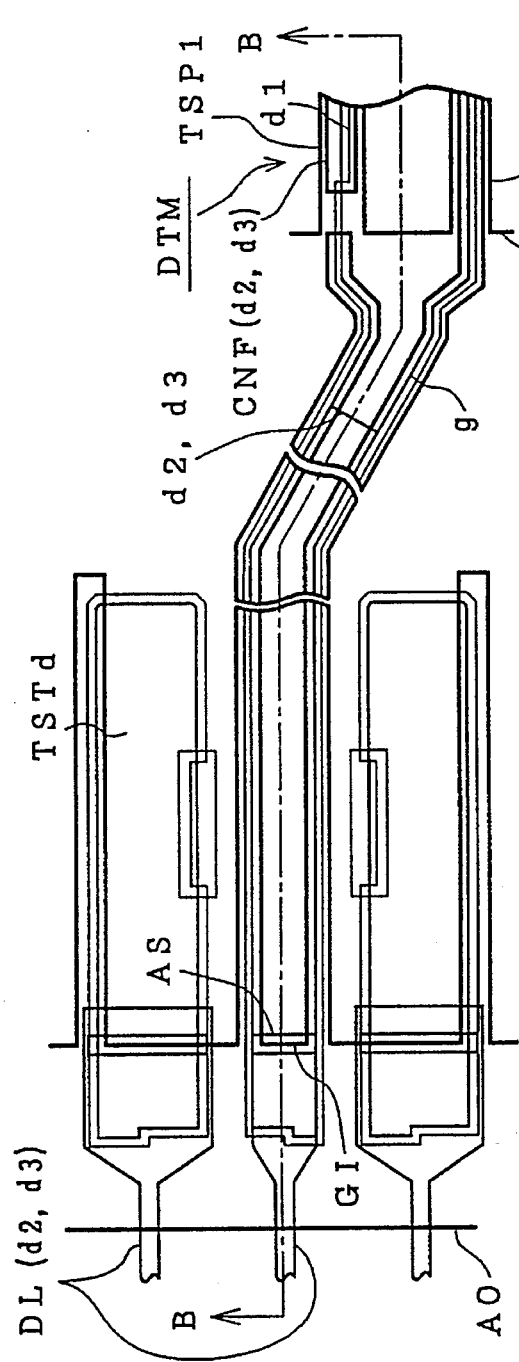
FIG. 11(A) presents a top plan view and FIG. 11(B) presents a section showing the vicinity of a connecting portion between a gate terminal GTM and a gate signal line DL.
Figure 11B:
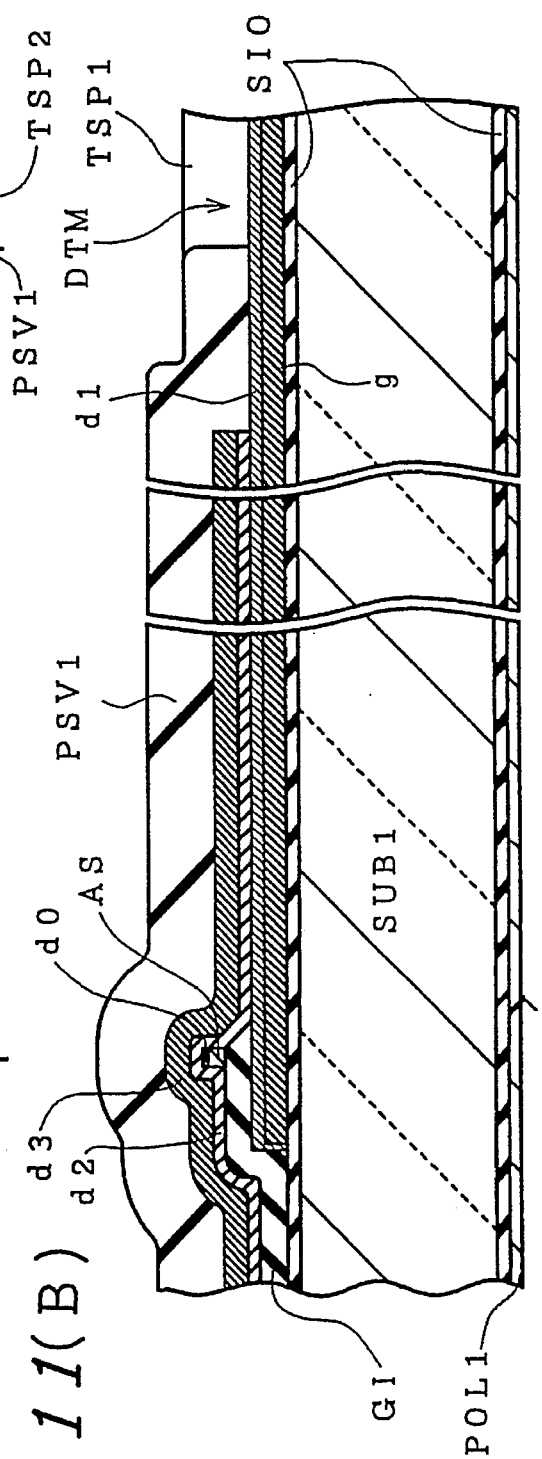

FIGS. 11(A) and 11(B) show the connection from the video signal line DL to its external connection terminal, the drain terminal DTM. FIG. 11(A) is a plan view and FIG. (B) is a cross section taken along the line B—B of FIG. 11(A). The figures cover the upper right area in FIG. 7 though the direction of the figures is changed for convenience. An area toward the right end in these figures corresponds to the upper end portion (or lower end portion) of the lower transparent glass substrate SUB1.

TSTd is an inspection terminal and has a greater width than interconnects for easy contact by a probe, though external circuits are not connected to it. Similarly, the drain terminal DTM is increased in width for connection with external circuits. The inspection terminals TSTd and the external connection drain terminals DTM are alternately arranged in staggered relationship in the vertical direction. The inspection terminals TSTd, as shown, are terminated without reaching the end of the lower transparent glass substrate SUB1. On the other hand, the drain terminals DTM constitute a group of terminals Td (suffix omitted), as shown in FIG. 7, and extend further beyond the cutting line CT1 of the lower transparent glass substrate SUB1. During the manufacturing process, all of these drain terminals are short-circuited to each other by an interconnect SHd to prevent electrostatic breakdown. The drain terminals DTM are connected to the end of the video signal lines DL opposite the inspection terminals TSTd with the matrix being interposed therebetween. Conversely, the inspection terminals TSTd are connected to the end of the video signal lines DL opposite the drain terminals DTM with the matrix being interposed therebetween.

The drain terminals DTM, like the gate terminals GTM, are formed of two layers-aluminum film g and transparent conductive film dl-and are connected to the video signal lines DL at portions where the insulation film GI is removed.

The semiconductor layer AS formed over the end portion of the insulating film GI is provided for etching the edge of the insulating film GI in a taper shape. For connection with an external circuit, the passivation film PSV1 is naturally removed from the drain terminal DTM. Letters AO designate the aforementioned anodizing mask which has its boundary formed to enclose the entirety of the matrix. As shown, the lefthand side is covered with the mask, but the remaining uncovered portion has no aluminum layer g so that it has no relation to the pattern.

The drain terminal DTM is formed at its side with the connection portion where the transparent conductive film is not provided but where a connection film CNF made of the second and third conductive films d2, d3 is provided. Because the connection film CNF connects the aluminum film g and the transparent conductive film dl, the resistance between the aluminum film g and the transparent conductive film dl is prevented from increasing even when an insulating film ($Al_2O_3$) is formed between the aluminum film g and the transparent conductive film dl. In other words, the resistance of the drain terminal DTM will not increase.

At the side of the drain terminal DTM where the connection film CNF is provided, a terminal side portion protective film TSP1 is formed at the same level as the passivation film PSV1. At the other side of the drain terminal DTM, a terminal side portion protective film TSP2 is provided, which consists of a film formed at the same level as the insulation film GI and a film formed at the same level as the passivation film PSV1. The terminal side portion protective films TSP1, TSP2 prevent the side portion of the aluminum film g from being dissolved by a cleaning liquid or by galvanic corrosion, thereby keeping the resistance of the drain terminal DTM from increasing. Because a film at the same level as the insulating film GI—the first layer of the terminal side portion protective film TSP2—is provided, if there are pin holes in the transparent conductive film dl and second conductive film d2 on the side of the drain terminal DTM where the terminal side portion protective film TSP2 is provided, the aluminum film g can be protected against damage during the etching of the third conductive film d3. This in turn prevents the resistance of the drain terminal DTM from increasing.

The leadout lines from the matrix portion to the drain terminal portion DTM are constructed as shown in FIG. 8(C), in which the conductive films d2, d3 at the same level as the video signal lines DL are laminated midway of the seal pattern SL just over the transparent conductive film dl and aluminum film g, which are at the same level as the drain terminal portion DTM. This construction is intended to minimize the probability of breakage of lines and thereby protect the galvanically corrosive third conductive film (Al layer) d3 with the passivation film PSV1 and the seal pattern SL.

<<Equivalent Circuit of Whole Display Circuit>>

Figure 12:
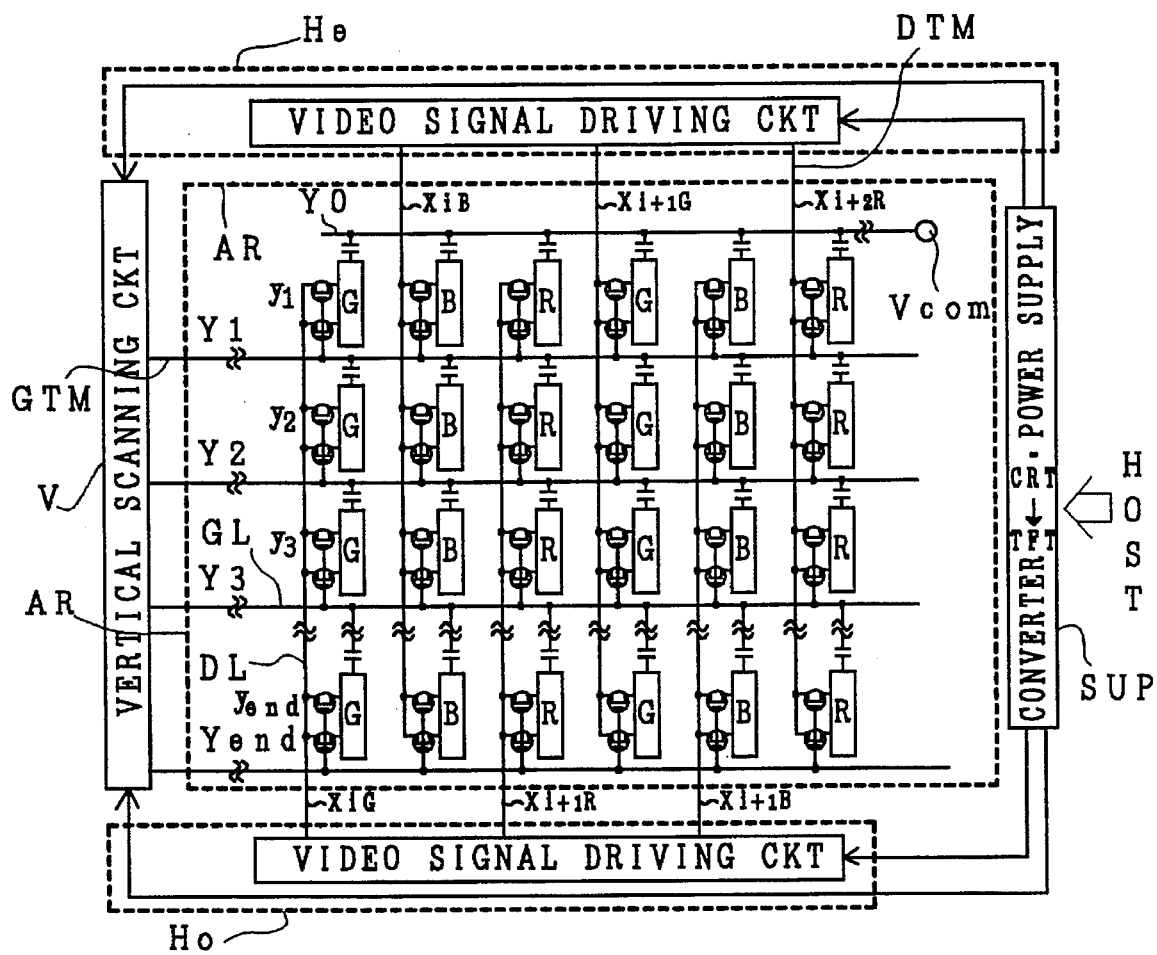
FIG. 12 is an equivalent circuit diagram showing a liquid crystal display circuit of a color liquid crystal display device of active matrix type.

FIG. 12 shows an equivalent circuit diagram of the display matrix portion and a wiring diagram of its peripheral circuits. Although this drawing is a circuit diagram, it is depicted in a manner to correspond to a practical geometric disposition. Letters AR designate a matrix array formed by disposing a plurality of pixels two-dimensionally.

In the drawing, letter X designates the video signal line, and suffixes G. B and R are added to correspond to green, blue and red pixels, respectively. Letter Y designates the scanning signal line GL, and suffixes 1, 2, 3, —, and so on are added in accordance with the sequence of the scanning timing.

The video signal line X (whose suffix is omitted) is alternately connected with the upper (or odd-numbered)

video signal driving circuit He and with the lower (or even-numbered) video signal driving circuit Ho.

The scanning signal line Y (whose suffix is omitted) is connected with a vertical scanning circuit V.

Letters SUP designate a circuit which includes a power supply circuit for obtaining a plurality of divided and stabilized voltage sources from one voltage source, and a circuit for converting data for a CRT (i.e., Cathode Ray tube) from a host (i.e., a higher-order operational processor) to data for the TFT liquid crystal display device.

<<Working of Latching Capacitor Cadd>>

The latching capacity element Cadd functions to reduce the influences of the gate potential variation $\Delta Vg$ upon the center potential (e.g., the pixel electrode potential) V1c when the thin film transistor TFT switches, as expressed by the following formula:

$$\Delta V1c = \{Cgs/(Cgs + Cadd + Cpix)\} \times \Delta Vg$$

where Cgs represents a parasitic capacitance formed between the gate electrode GT and source electrode SD1 of the thin-film transistor TFT; Cpix represents a liquid crystal capacitance formed between the transparent pixel electrode ITO1(PIX) and the common transparent pixel electrode ITO2(COM); and $\Delta V1c$ represents the amount of change in the pixel electrode potential caused by $\Delta Vg$. This variation $\Delta V1c$ causes the DC component to be added to the liquid crystal LC and can be reduced the more, the higher the latching capacitor Cadd. Moreover, the latching capacitor Cadd functions to elongate the discharge time and stores the video information for a long time after the thin film transistor TFT is turned off. The DC component to be applied to the liquid crystal LC can improve the lifetime of the liquid crystal LC, to reduce so-called "printing", by which the preceding image is left at the time of switching the liquid crystal display frame.

Since the gate electrode GT is enlarged to such an extent as to cover the semiconductor layer AS completely, as has been described hereinbefore, the overlapped area with the source electrode SD1 and the drain electrode SD2 is increased, resulting in the adverse effect that the parasitic capacity Cgs is increased to make the center potential V1c subject to being influenced by the gate (scanning) signal Vg. However, this disadvantage can be eliminated by providing the latching capacitor Cadd.

The latching capacity of the latching capacitor Cadd is set from the pixel writing characteristics to a level four to eight times as large as that of the liquid crystal capacity Cpix $$4 * Cpix < Cadd < 8 + Cpix$$

and eight to thirty two times as large as that of the capacity Cgs $$8 * Cgs < Cadd < 32 + Cgs$$

The initial stage scanning signal line GL (i.e., $Y_0$), to be used only as a capacity electrode line, is set to the same potential as that of the common transparent pixel electrode (Vcom) ITO2. In the example of FIG. 7, the initial stage scanning signal line is short-circuited to the common transparent pixel ITO electrode (COM) through the terminal GTO, the leading line INT, a terminal DTO and an external line. Alternatively, the initial stage latching capacity electrode line $Y_0$ may be connected with the final stage scanning signal line Yend or a DC potential point (or AC ground point) other than the Vcom, or connected to receive one excess scanning pulse $Y_0$ from the vertical scanning circuit V.

<<Method of Manufacture>>

Next, by referring to FIGS. 13 through 15, the steps of manufacturing the lower transparent glass substrate SUB1 side of the above-mentioned liquid crystal display device will be described. In these figures, the central letters indicate the abbreviations of the step names, with the left-hand side representing the pixel portions in FIG. 3 and the right-hand side representing the process flow, as viewed in section in the vicinity of the gate terminals shown in FIG. 10(B).

Steps A to H except for step D correspond to individual photo processing steps. The cross section of each step indicates the state of the device in which the photo processing has been completed and the photoresist removed. In this embodiment, the photo processing involves a series of operations ranging from the coating of photoresist to the selective exposure using a mask to development of the exposed photoresist. Repetitive explanation of the photo processing will be omitted. Now, each of the divided processes will be described in the following.

Figure 13:
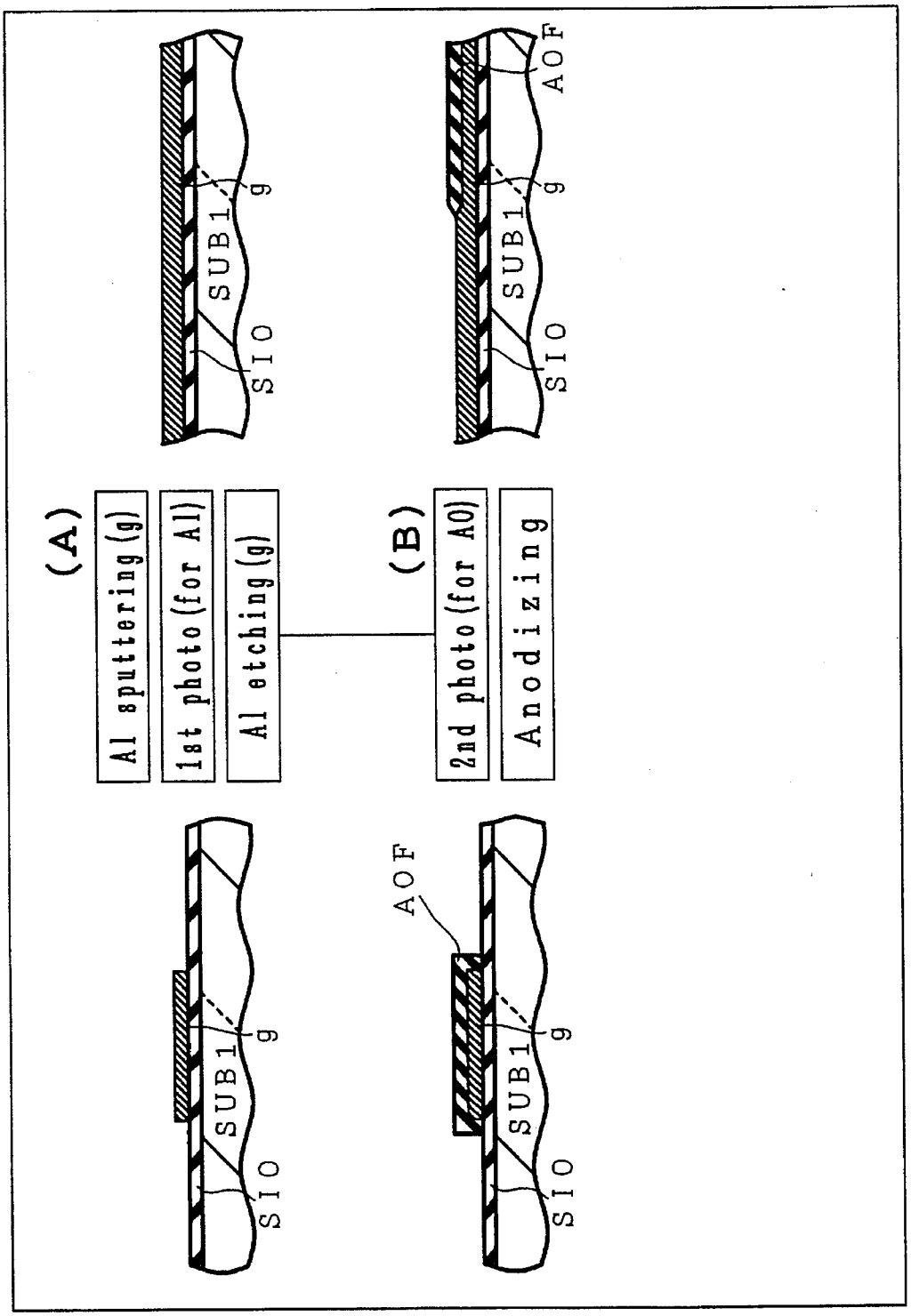
FIG. 13 presents a flow chart of sections of a pixel portion and a gate terminal portion and shows the fabrication steps A and B at the side of a lower transparent glass substrate SUB1.

Step A, FIG. 13

The lower transparent glass substrate SUB1 made of 7059 glass (product name) is deposited with a silicon oxide film SIO on both sides by dip treatment and is baked at 500° C. for 60 minutes.

An aluminum film g of Al-Ta (added amount of Ta: 1.5 atomic percent) is deposited to a thickness of 3000 Å by sputtering. After photo processing, the aluminum film 9 is selectively etched away by a mixed acid solution of phosphoric acid, nitric acid and glacial acetic acid to form anodic-oxidized bus lines (not shown)—which connect the scan signal lines GL, gate electrodes GT, electrodes PL1, gate terminals GTM, drain terminals DTM and gate terminals GTM—bus lines (not shown) short-circuiting the drain terminals DTM, and anodic-oxidized pads (not shown) connected to the anodic-oxidized bus lines.

Step B, FIG. 13

After the photolithographic treatment (i.e., after the formation of the aforementioned anodized mask AO), the lower transparent glass substrate SUB1 is dipped in the anodizing liquid which is prepared by diluting a solution containing 3% of tartaric acid adjusted to PH 6.2 to 6.3 with a solution of ethylene glycol, and the anodizing current density is adjusted to 0.5 mA/cm$^2$ (for anodization at a constant current). Next, an anodization is carried out till an anodization current of 125 V necessary for a predetermined Al$_2$O$_3$ film thickness is reached. After this, the substrate SUB1 is desirably held in this state for several ten minutes (for anodization at a constant voltage). This is important for achieving a uniform Al$_2$O$_3$ film. Thus, the aluminum g is anodized to form an anodized film AOF having a thickness of 1,800 angstroms over the scanning signal line GL, the gate electrode GT and the electrode PL1.

Figure 14:
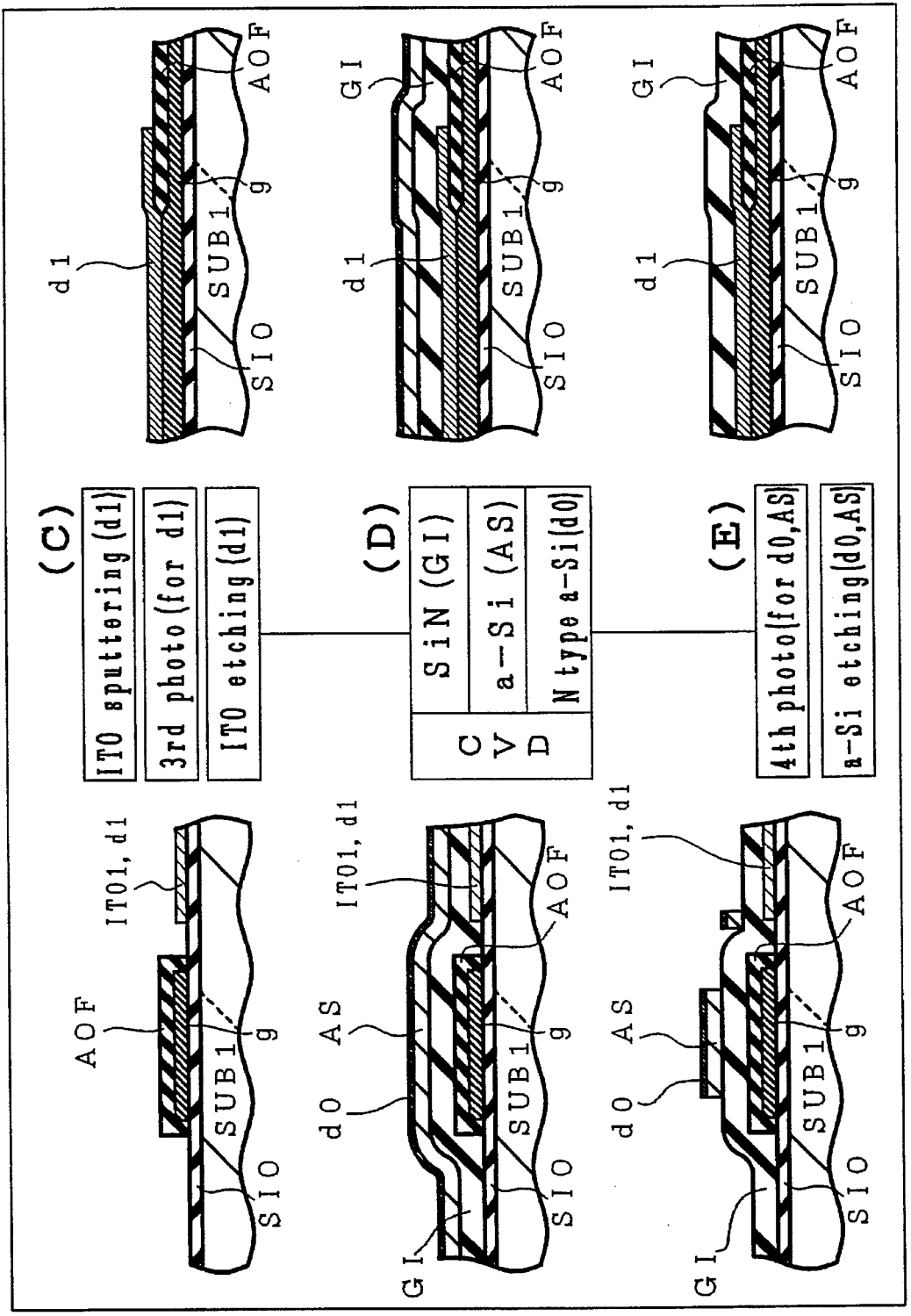
FIG. 14 presents flow chart of sections of the pixel portion and the gate terminal portion and shows the fabrication steps C to E at the side of the lower transparent glass substrate SUB1.

Step C, FIG. 14

A transparent conductive film dl is deposited to a thickness of 1400 Å by sputtering. After photo processing, the transparent conductive film dl is selectively etched away by an etching liquid, a mixed acid solution of hydrochloric acid and nitric acid, to form the uppermost layer of the gate terminals GTM and drain terminals DTM, and transparent pixel electrodes ITO1.

Step D, FIG. 14

Ammonia gas, silane gas and nitrogen gas are introduced into a plasma CVD apparatus to form a Si nitride film having a thickness of 2,000 angstroms, and silane gas and hydrogen gas are introduced into the plasma CVD apparatus to form an i-type amorphous Si film having a thickness of 2,000 angstroms. After this, hydrogen gas and phosphine gas are introduced into the plasma CVD apparatus to form an N(+)-type amorphous Si film having a thickness of 300 angstroms.

Step E, FIG. 14

After photo processing, SF6 and CCl4 are used as a dry etching gas to selectively etch the N(+) type amorphous silicon film and i-type amorphous silicon film to form the islands of i-type semiconductor layer AS.

Figure 15:
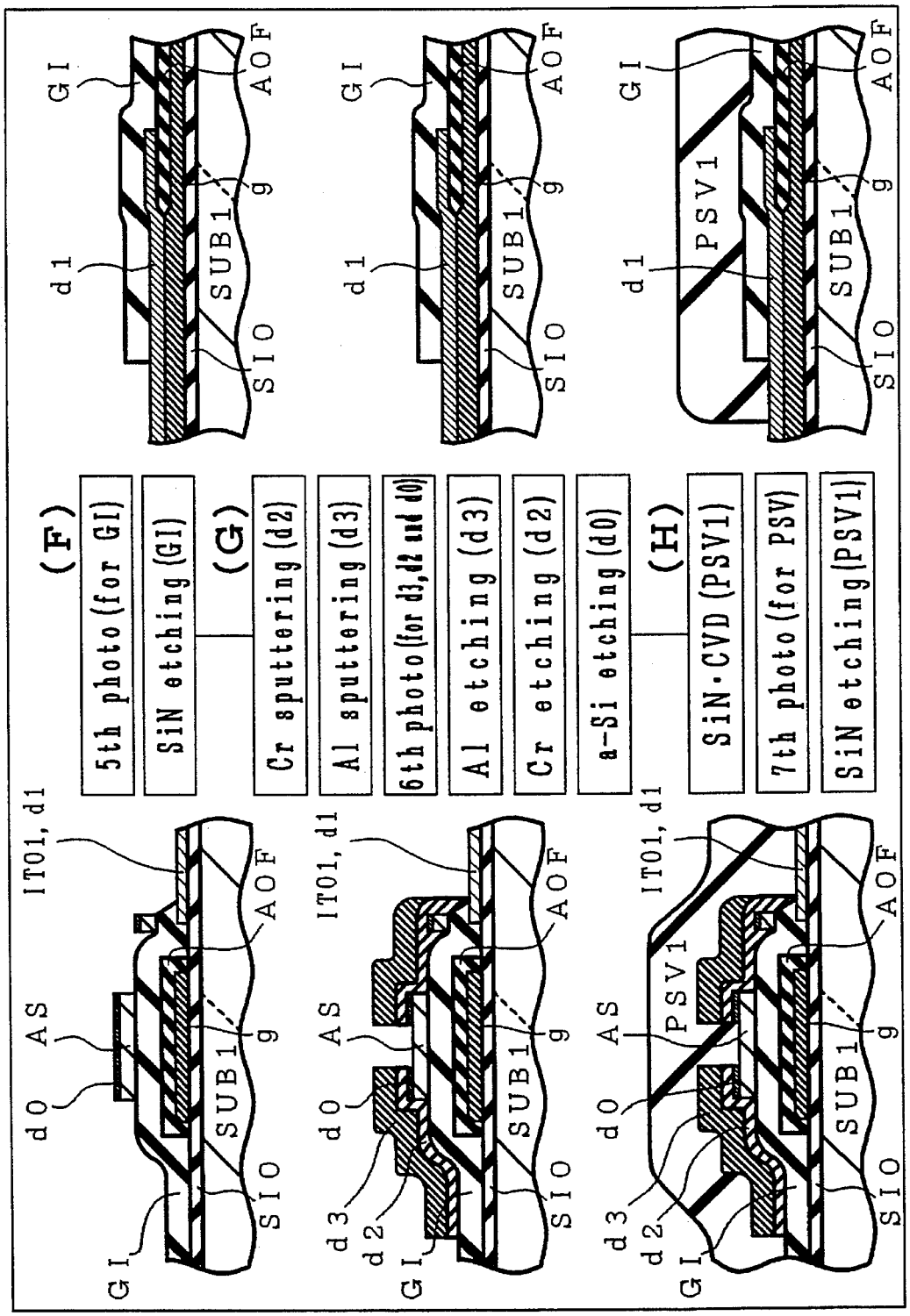
FIG. 15 presents a flow chart of sections of the pixel portion and the gate terminal portion and shows the fabrication steps F to H at the side of the lower transparent glass substrate SUB1.

Step F, FIG. 15

After photo processing, $SF_6$ gas is used as a dry etching gas to selectively etch the silicon nitride film to form the insulating film GI and the first layer of the terminal side portion protective film TSP2.

Step G, FIG. 15

The second conductive film d2 of Cr is deposited to a thickness of 600 Å by sputtering. The third conductive film d3 of Al-Ta (added amount of Ta: 1.5 atomic percent) is sputtered on the second conductive film d2 to a thickness of 4000 Å. After photo processing, the third conductive film d3 is etched away by a similar solution to that used in the step B and the second conductive film d2 is etched by a cerium ammonium nitrate solution to form the video signal lines DL, source electrodes SD1, drain electrodes SD2 and connection films CNF. Next, $CCl_4$ and $SF_6$ are introduced into the dry etching apparatus to etch the N(+) type amorphous silicon film, selectively removing the N(+) type semiconductor layer d0 between the source and the drain.

Step H, FIG. 15

Ammonium gas, silane gas and nitrogen gas are introduced into the plasma CVD apparatus to deposit a silicon nitride film 1 μm thick. After photo processing, photolithography is performed using $SF_6$ as a dry etching gas to selectively etch the silicon nitride film to form the passivation film PSV1, the terminal side portion protective film TSP1, and the second layer of the terminal side portion protective film TSP2.

<<Structure of Whole Liquid Crystal Display Module>>

Figure 16:
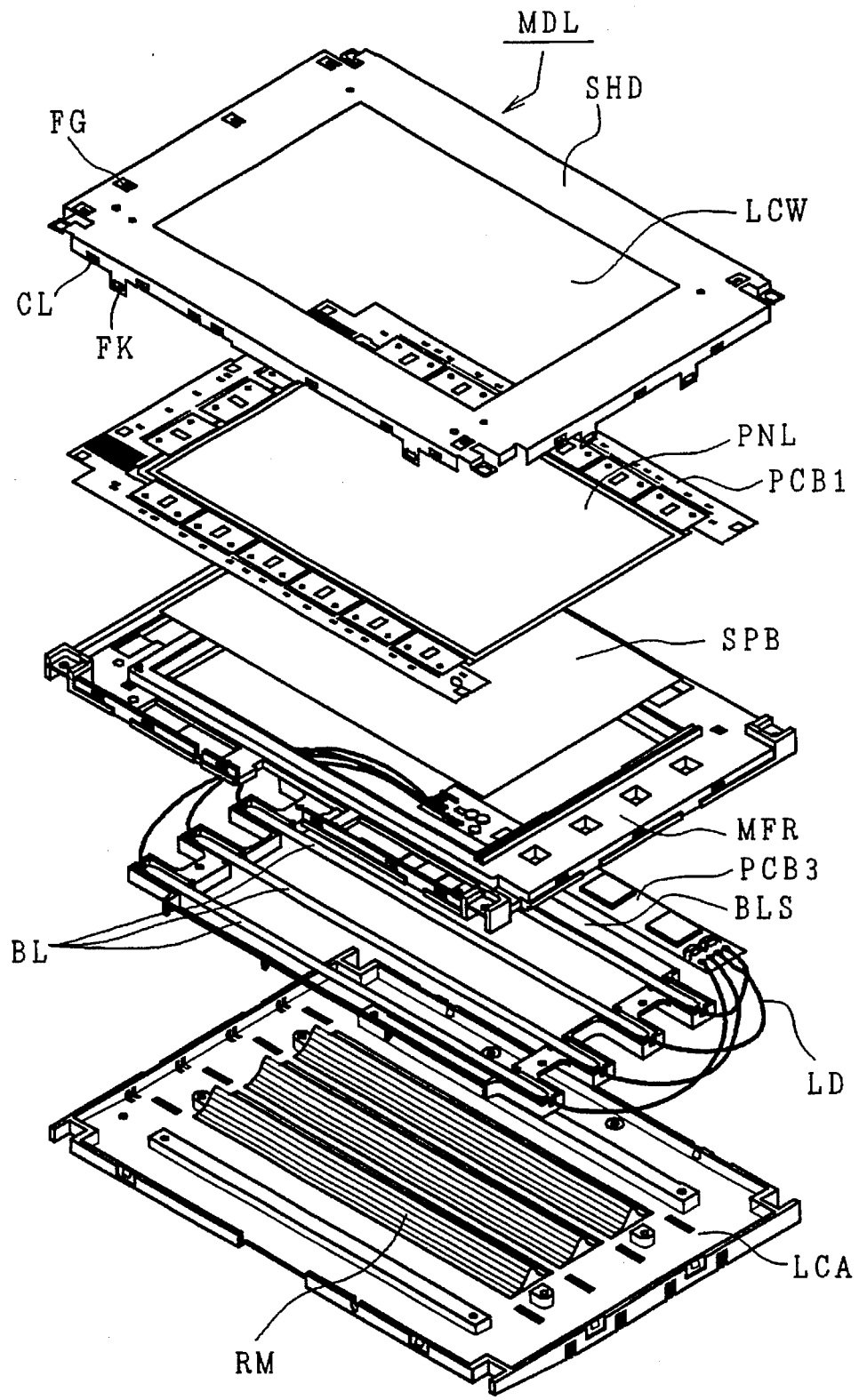
FIG. 16 is an exploded perspective view showing a liquid crystal display module.

FIG. 16 is an exploded perspective view showing a liquid crystal display module MDL.

Letters SHD designate a shield casing (=metal frame) made of a metal plate; letters LCW designate a liquid crystal display window of the shield casing SHD; letters PNL designate a liquid crystal display panel; letters SPX designate an optical diffusion plate; letters MFR designate a middle frame; letters BL designate back lights; letters BLS designate a back light support; and letters LCA designate a lower casing. All of these members are stacked in vertical positions, as shown, to assemble a module MDL.

The module MDL is firmly secured by a claw CL and a hook FK formed on the shield case SHD.

The intermediate frame MFR is formed into the shape of a frame to provide an opening corresponding to the display window LCW, and its frame portion is provided with bulges and recesses according to the shape and thickness of the dispersion board, backlight support BLS and various circuit components, as well as with openings for heat dissipation.

The lower case LCA also serves as a reflector for backlight and has reflection bulges corresponding to the backlight (fluorescent lamps) BL for efficient reflection.

<<Display Panel PNL and Drive Circuit Board PCB1>>

Figure 17:
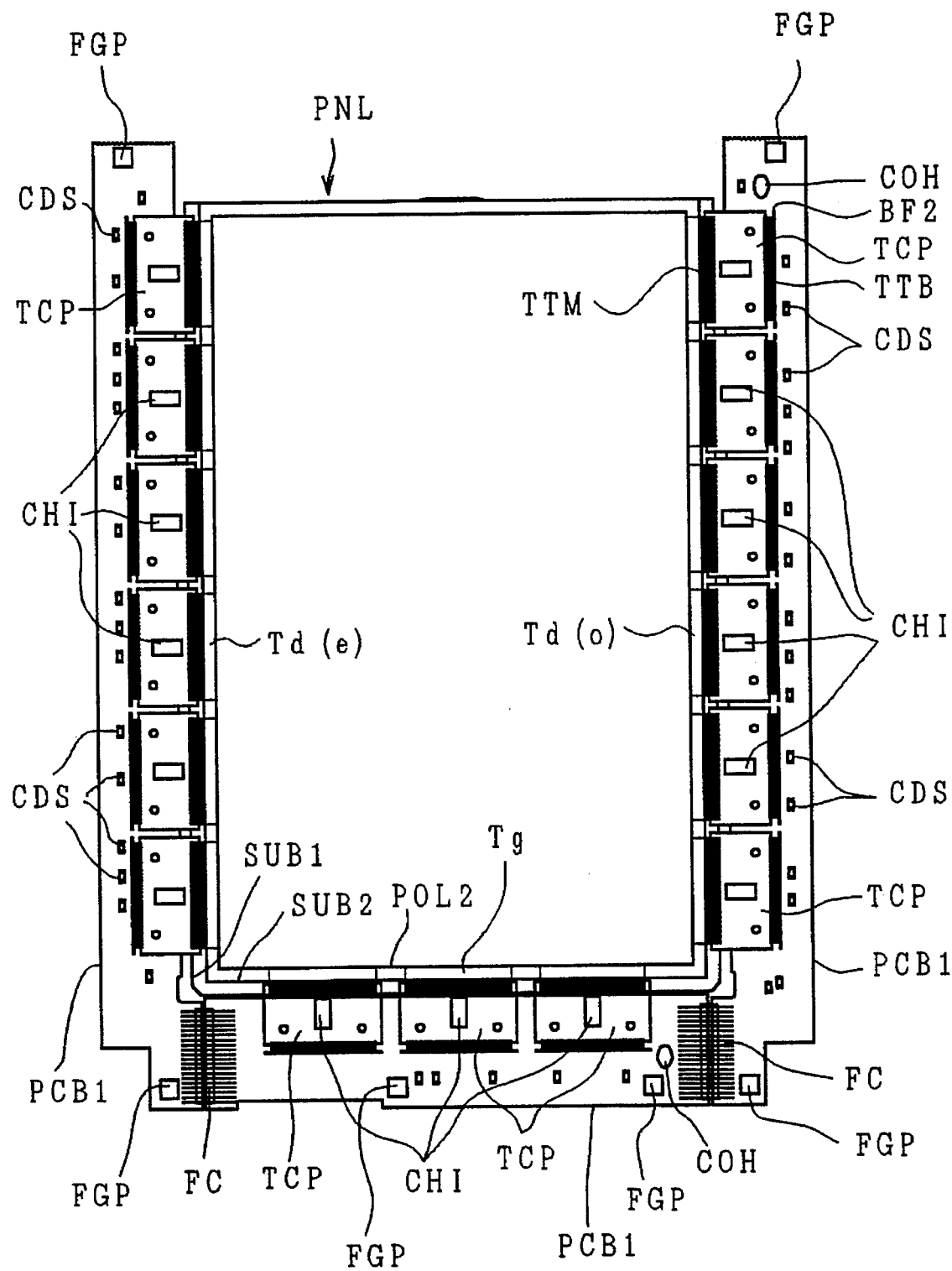
FIG. 17 is a upper side view showing the state in which peripheral drive circuits are packaged in the liquid crystal display panel.

FIG. 17 is a top view showing the display panel PNL connected with the video signal drive circuits He, Ho and the vertical scanning circuit V.

CHI is a drive integrated circuit chip for driving the display panel PNL (lower three chips are drive integrated circuit chips on the vertical scan circuit V side, and six each on the left and right are drive integrated circuit chips on the video signal drive circuit He, Ho side). Designated as TCP is, as described in FIG. 18 and 19, a tape carrier package mounted with the drive integrated circuit chip by tape automated bonding (TAB). Denoted as PCB1 is a drive circuit board mounted with a tape carrier package TCP and a capacitor CDS. The drive circuit board is divided into three parts. FGP is a frame ground pad, which is soldered with spring-shaped fragments FG that are inserted into the cuts in the shield case SHD. FC is a flat cable that electrically connects the lower side drive circuit board PCB1 to the left side drive circuit board PCB1 and also electrically connects the lower side drive circuit board PCB1 to the right side drive circuit board PCB1. This flat cable FC consists, as shown, of a plurality of lead wires (phosphor bronze plated with Sn) sandwiched and supported between a striped polyethylene layer and a striped polyvinyl alcohol layer.

<<Tape Carrier Package TCP Connection Structure>>

Figure 18:
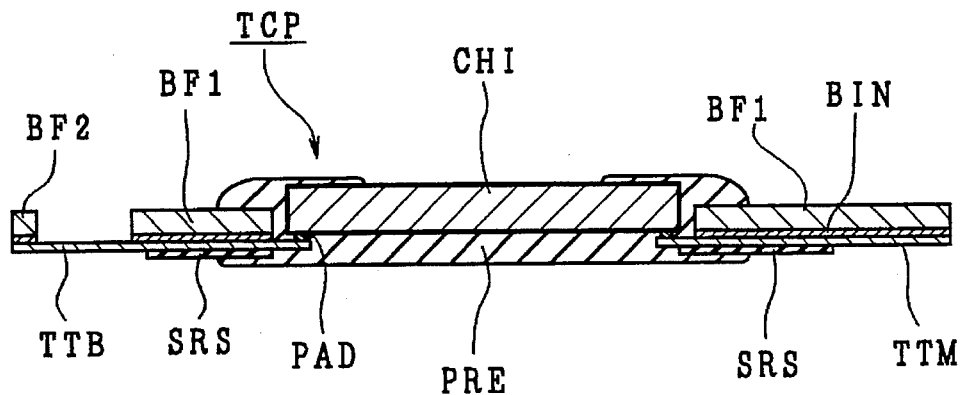
FIG. 18 is a section showing a structure of a tape carrier package TCP, in which an integrated circuit chip CHI constituting a drive circuit is mounted on a flexible wiring substrate.
Figure 19:
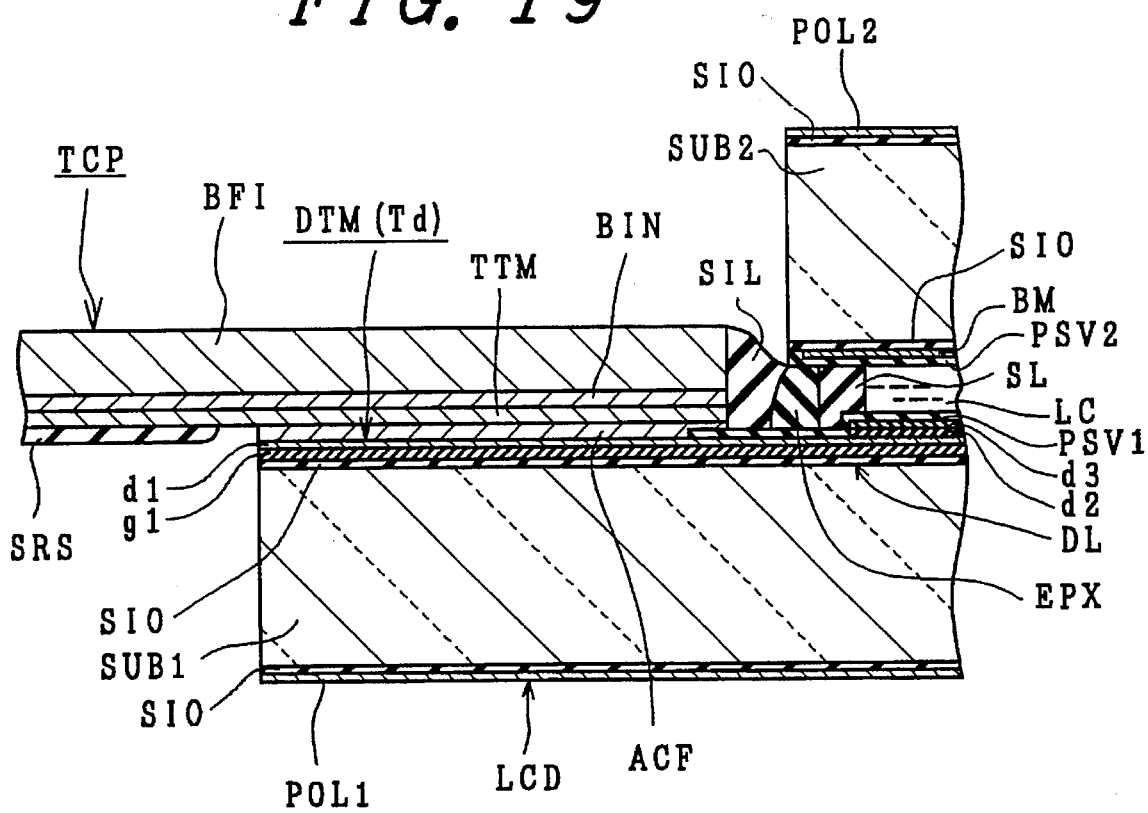
FIG. 19 is a section showing the state of an essential portion, in which the tape carrier package TCP is connected with a video signal circuit terminal DTP of a liquid crystal display panel PNL.

FIG. 18 shows the cross-sectional structure of a tape carrier package TCP that consists of an integrated circuit chip CHI mounted on a flexible wiring board which provides the scanning signal driven circuit V and the video signal drive circuits He, Ho. FIG. 19 is a fragmentary cross section showing the tape carrier package TCP connected, in this example, to the video signal circuit drain terminal DTM of the liquid crystal display panel.

In the figure, TTB represents an input terminal and wiring portion of the integrated circuit chip CHI. TTM is an output terminal and wiring portion of the integrated circuit chip CHI. These are made, for example, of Cu and their inner ends (usually called inner leads) are connected to the bonding pads PAD of the integrated circuit CHI by the so-called facedown bonding method. Outer ends of the terminals TTB and TTM (usually called outer leads) correspond to the input and output of the semiconductor integrated circuit chip CHIP, respectively, and are connected, as by solder, to the CRT/TFT conversion circuit and power supply circuit and through an anisotropic conductive film ACF to the liquid crystal display panel PNL. The tape carrier package TCP is connected to the panel in such a way that its end portions cover the passivation film PSV1, which exposes the drain terminal DTM on the panel PNL side. Thus, the outer connection terminal DTM (GTM) is covered at least by the passivation film PSV1 or tape carrier package TCP and therefore has a greater resistance against galvanic corrosion.

Designated as BF1 is a base film made of polyimide; and SRS is a solder resist film that works as a mask to prevent excess solder from adhering to unwanted areas. The gap between the transparent glass substrates SUB1, SUB2 outside the seal pattern SL is protected by epoxy resin EPX after cleaning. Further, silicone resin SIL is filled between the tape carrier package TCP and the upper transparent glass substrate SUB2, thus providing multiple protection.

<<Drive Circuit Substrate PCB2>>

Figure 20:
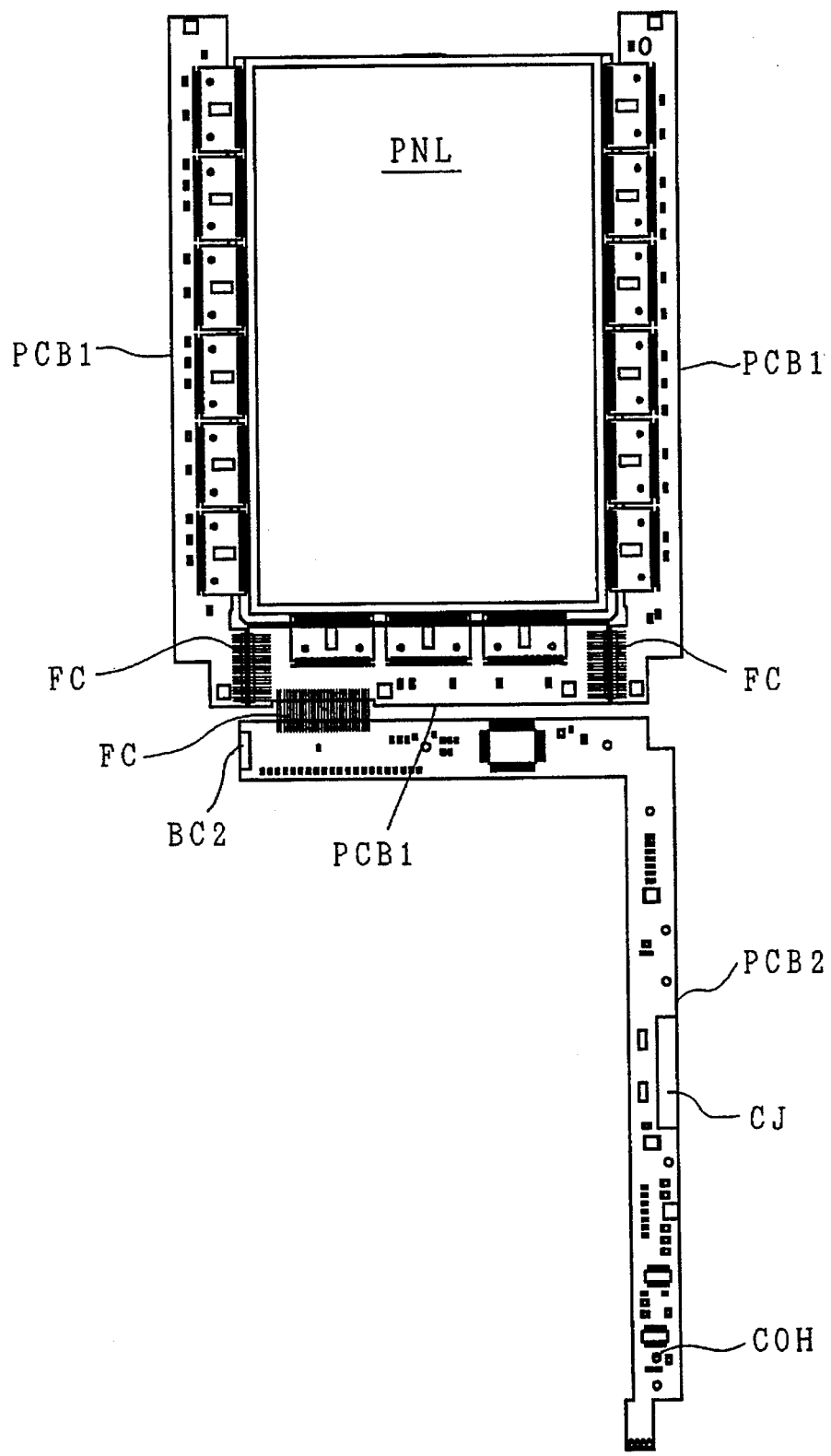
FIG. 20 is an upper side view showing the connection state between the peripheral drive circuit substrate (as viewed from the upper side) of the liquid crystal display and the drive circuit substrate (as viewed from the lower side) to be mounted on the middle frame.
Figure 21:
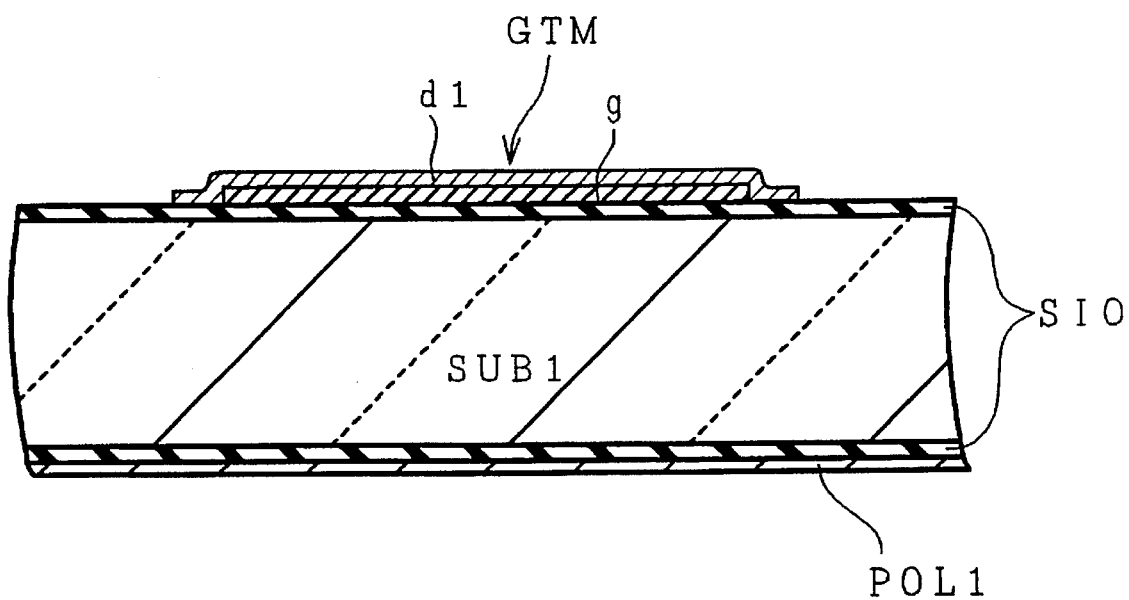
FIG. 21 is a cross section showing the gate terminal portion of the conventional liquid crystal display device.

The drive circuit substrate PCB2 of the liquid crystal display LCD to be held and mounted in the middle frame MFR is formed into an L-shape, as shown in FIG. 20, to implement electronic parts such as ICs, capacitors or resistors. In this drive circuit substrate PCB2, there are mounted a power supply circuit for achieving a plurality of divided stable voltage sources from one voltage source and a circuit including a circuit for converting data for a CRT (i.e., cathode Ray Tube) from a host (i.e., a higher-order operational processor) to data for the TFT liquid crystal display device. Letters CJ designate a connector connection portion to be connected with a not-shown connector to be connected with the outside. The drive circuit board PCB2 and the inverter circuit board PCB3 are electrically interconnected by a backlight cable passing through a connector hole provided in the intermediate frame MFR.

The drive circuit board PCB1 and the drive circuit board PCB2 are electrically connected to each other through a flexible flat cable FC. During assembly, the drive circuit board PCB2 is placed in overlapping contact with the back side of the drive circuit board PCB1 by bending the flat cable 180 degrees and is fit into a recess in the intermediate frame MFR.

The above embodiment concerns the case where the first metal film is an aluminum film. This invention can also be applied to a case in which the first metal film is a tantalum film.

We claim:

1. A liquid crystal display device having terminals in a peripheral portion outside the display area, each of said terminals comprising:

a first metal film;

a transparent conductive film directly deposited on a portion of the first metal film;

a connection portion for enabling electrical connection provided on a side portion of the terminal where the transparent conductive film is not formed; and a connection film for electrical connection provided on the connection portion to electrically connect the first metal film and the transparent conductive film.

2. A liquid crystal display device according to claim 1, wherein the first metal film is an aluminum film.

3. A liquid crystal display device according to claim 1, wherein the first metal film is a tantalum film.

4. A liquid crystal display device according to claim 1, further comprising a terminal side portion protective film provided on the side portion of the terminal.

\* \* \* \* \*